US010411984B2

(12) United States Patent
Hoglund

(10) Patent No.: US 10,411,984 B2
(45) Date of Patent: Sep. 10, 2019

(54) SYSTEMS AND METHODS RELATED TO DIAGNOSTICS FOR ETHERNET RINGS BASED ON MEDIA REDUNDANCY PROTOCOL

(71) Applicant: Johnson Controls Technology Company, Plymouth, MI (US)

(72) Inventor: David E. Hoglund, Shorewood, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 180 days.

(21) Appl. No.: 15/376,565

(22) Filed: Dec. 12, 2016

(65) Prior Publication Data

US 2018/0167301 A1  Jun. 14, 2018

(51) Int. Cl.
| | |
|---|---|
| G06F 15/173 | (2006.01) |
| H04L 12/26 | (2006.01) |
| H04L 12/28 | (2006.01) |
| H04L 12/43 | (2006.01) |
| H04L 12/733 | (2013.01) |
| H04L 12/24 | (2006.01) |

(52) U.S. Cl.
CPC ...... H04L 43/0894 (2013.01); H04L 12/2803 (2013.01); H04L 12/43 (2013.01); H04L 41/0645 (2013.01); H04L 43/0811 (2013.01); H04L 45/20 (2013.01); H04L 41/0654 (2013.01); H04L 43/16 (2013.01)

(58) Field of Classification Search
CPC . H04L 43/0894; H04L 43/0811; H04L 43/16; H04L 41/0645; H04L 41/0654; H04L 45/20; H04L 12/43; H04L 12/2803
See application file for complete search history.

(56) References Cited

U.S. PATENT DOCUMENTS 6,021,112 A * 2/2000 Sugawara ............... H04J 3/085
370/222
6,430,151 B1 * 8/2002 Glas ......................... H04L 1/22
370/222

(Continued)

FOREIGN PATENT DOCUMENTS

EP  2 362 585 A1  8/2011

OTHER PUBLICATIONS

Extended European Search Report for European Patent Application No. 17206474.3, dated Feb. 13, 2018, 9 pages.

Primary Examiner — Richard G Keehn
(74) Attorney, Agent, or Firm — Foley & Lardner LLP

(57) ABSTRACT

A system and method of identifying faulted devices in an Ethernet network of a building management system (BMS). The system includes a network manager device, a first client device, and a second client device. A first port of the first client device is connected to a first port of the network manager device, a first port of the second client device is connected to a second port of the first client device and a second port of the second client device is connected to a second port of the network manager device. The network manager device is configured to transmit a frame having a count field. The first client device is configured to increment the count field once based on a successful transmission of the frame to the second client device and increment the count field twice based on a failed transmission to the second client device.

20 Claims, 12 Drawing Sheets

(56) References Cited

U.S. PATENT DOCUMENTS

| | | | | |
|---|---|---|---|---|
| 6,614,760 B1* | 9/2003 | Suzuki | ............... | H04L 12/5601 |
| | | | | 370/244 |
| 8,046,444 B2* | 10/2011 | Klug | ................. | G05B 19/0423 |
| | | | | 709/222 |
| 2007/0204068 A1* | 8/2007 | Oku | ....................... | H04L 12/66 |
| | | | | 709/251 |
| 2011/0205886 A1* | 8/2011 | Maruyama | ........ | H04L 12/40176 |
| | | | | 370/225 |
| 2012/0008530 A1* | 1/2012 | Kulkami | ................ | H04L 12/42 |
| | | | | 370/256 |
| 2017/0155576 A1* | 6/2017 | Addeo | .................. | H04L 12/437 |

* cited by examiner

SYSTEMS AND METHODS RELATED TO DIAGNOSTICS FOR ETHERNET RINGS BASED ON MEDIA REDUNDANCY PROTOCOL

BACKGROUND

The present disclosure relates generally to building management systems. The present disclosure relates more particularly to systems and methods for identifying faulted devices in a building management system that are connected in an Ethernet ring network.

A building management system (BMS) is, in general, a system of devices configured to control, monitor, and manage equipment in or around a building or building area. A BMS can include a heating, ventilation, and air conditioning (HVAC) system, a security system, a lighting system, a fire alerting system, another system that is capable of managing building functions or devices, or any combination thereof. BMS devices may be installed in any environment (e.g., an indoor area or an outdoor area) and the environment may include any number of buildings, spaces, zones, rooms, or areas. A BMS may include a variety of devices (e.g., HVAC devices, controllers, chillers, fans, sensors, etc.) configured to facilitate monitoring and controlling the building space. Throughout this disclosure, such devices are referred to as BMS devices or building equipment.

In some BMS systems, at least some of the devices are connected in a network and particularly, in an Ethernet network. Occasionally, some of these devices need to be fixed, replaced, or otherwise maintained. When a large number of devices are connected to the Ethernet network, it is cumbersome to manually inspect each device to determine if any device needs maintenance. Furthermore, when the Ethernet network has a large number of devices, and a device suddenly malfunctions, it can take quite some time to identify the malfunctioning device. While the malfunctioning device is being identified, other devices on the Ethernet network that interact with the malfunctioning device may experience decreased performance, and functions or operations in the BMS which involve the malfunctioning device can be adversely affected. Accordingly, it would be desirous to have systems and methods which can quickly and efficiently identify devices on an Ethernet network that need maintenance or are malfunctioned to avoid or minimize disruptions of the Ethernet network.

SUMMARY

One implementation of the present disclosure is a system having a network manager device having a first port and a second port. The system also includes a first client device having a first port and a second port, the first port of the first client device connected to the first port of the network manager device, and a second client device having a first port and a second port, the first port of the second client device connected to the second port of the first client device and the second port of the second client device connected to the second port of the network manager device. The network manager device is configured to transmit a frame having a count field. The first client device is configured to increment the count field once by a predetermined value based on a successful transmission of the frame to the second client device and the first client device is configured to increment the count field twice by the predetermined value based on a failed transmission to the second client device.

A further implementation of the present disclosure is a method of monitoring the integrity of a communication network having a manager device and a number of client devices connected to each other and to the manager device in a network configured according to a ring topology. The client devices are configured to be controlled by the manager device. The method includes transmitting a frame from the manager device to a first client device, and receiving the frame at the first client device. The method also includes incrementing a count field of the frame, transmitting the frame to a second client device from the first client device, receiving the frame at the second client device from the first client device, incrementing the count field of the frame, and transmitting the frame to a third client device. The method further includes receiving the frame at the manager device as a received frame and identifying from the count field of the received frame a number of client devices on the network.

A further implementation of the present disclosure is a method of identifying faulted devices in a network of a building management system (BMS) having a manager device and a number of client devices connected to each other and to the manager device in a ring topology, the client devices configured to be controlled by the manager device. The method includes transmitting a frame from the manager device to the client devices, the client devices being connected in series in the network and the frame having a count field. The method also includes receiving the frame with the count field at a first client device, incrementing the count field of the frame at the first client device, transmitting the frame to a second client device, and incrementing the count field of the frame again at the first client device based on the first client device being unable to transmit the frame to the second client device. The first client device configured to transmit the frame back to the manager device. The method additionally includes receiving the frame at the manager device as a received frame, determining by the manager device if the network is in an open condition or a closed condition based on the received frame, and determining from the count field of the received frame an identity of a faulted client device.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Building Management System and HVAC System

Figure 1:
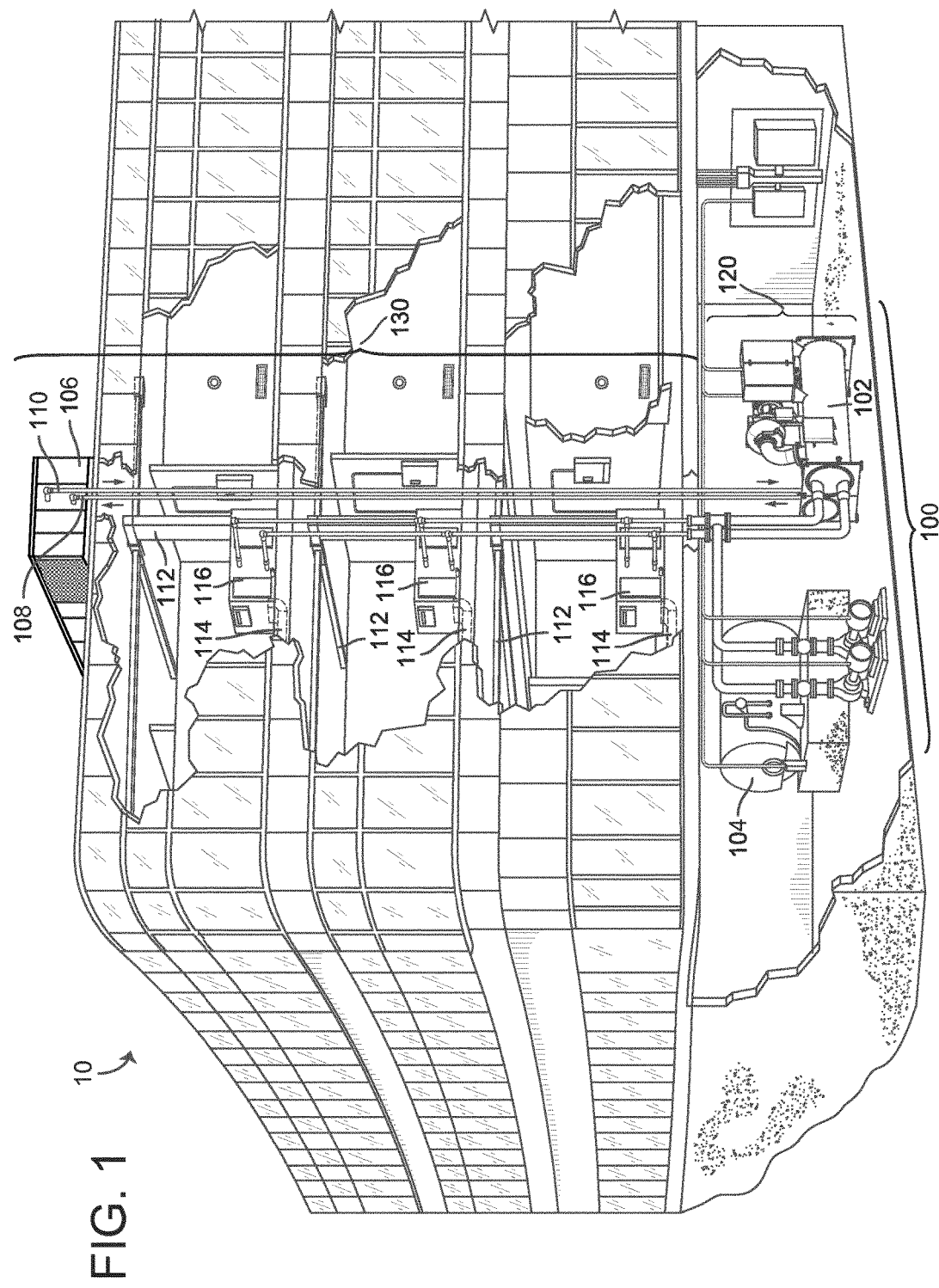
FIG. 1 is a drawing of a building equipped with a building management system (BMS) and a HVAC system, according to some embodiments.

Referring now to FIGS. 1-4, an exemplary building management system (BMS) and a heating, ventilation, and air conditioning (HVAC) system in which the systems and methods of the present disclosure can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Figure 2:
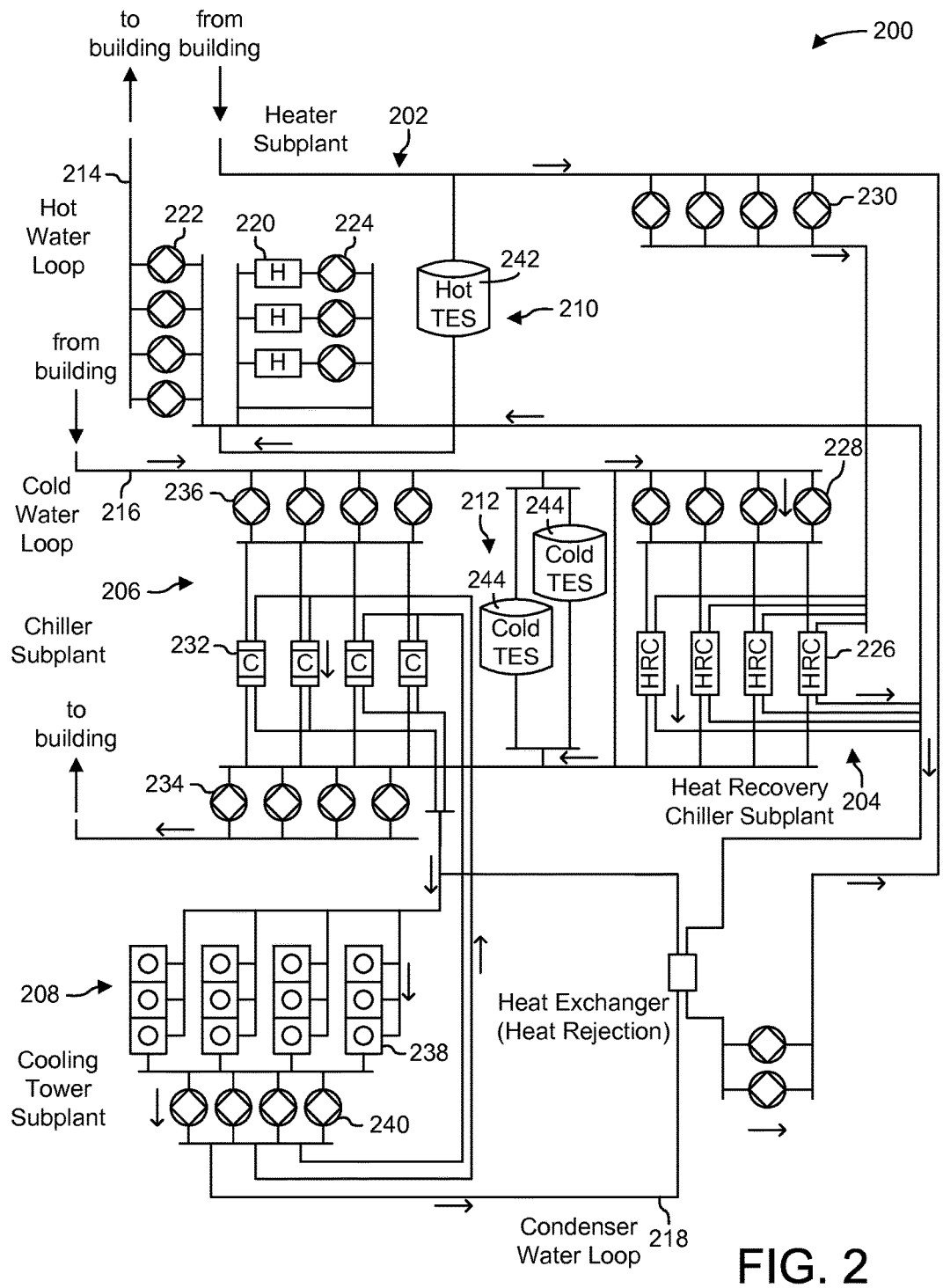
FIG. 2 is a schematic of a waterside system which can be used as part of the HVAC system of FIG. 1, according to some embodiments.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 and the building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold IES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot IES subplant 210 is shown to include a hot IES tank 242 configured to store the hot water for later use. Hot TES subplant 210 can also include one or more pumps or valves configured to control the flow rate of the hot water into or out of hot IES tank 242. Cold IES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
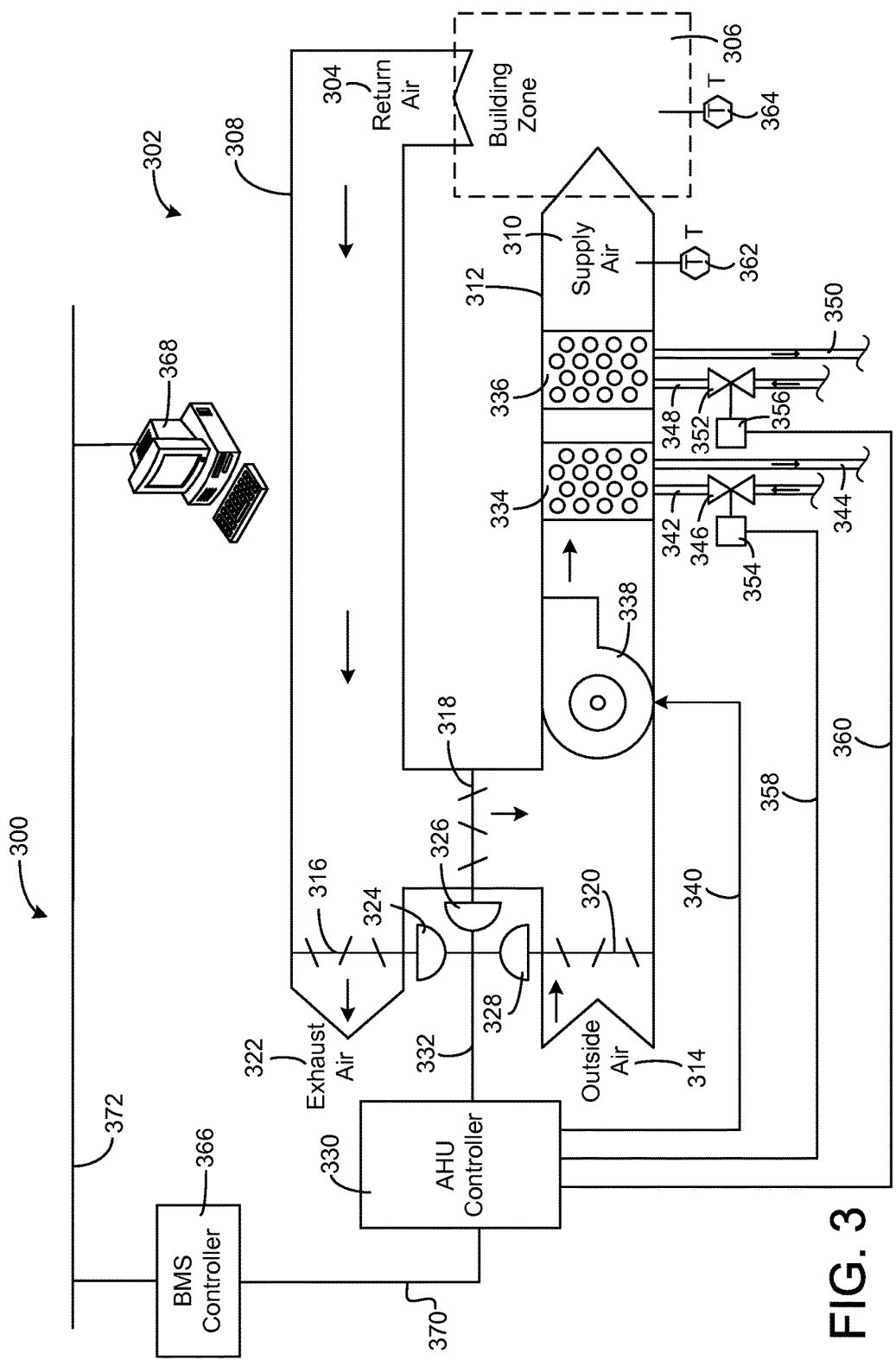
FIG. 3 is a block diagram illustrating an airside system which can be used as part of the HVAC system of FIG. 1, according to some embodiments.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive return air 304 and outside air 314. AHU 302 can be configured to operate an exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination thereof.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
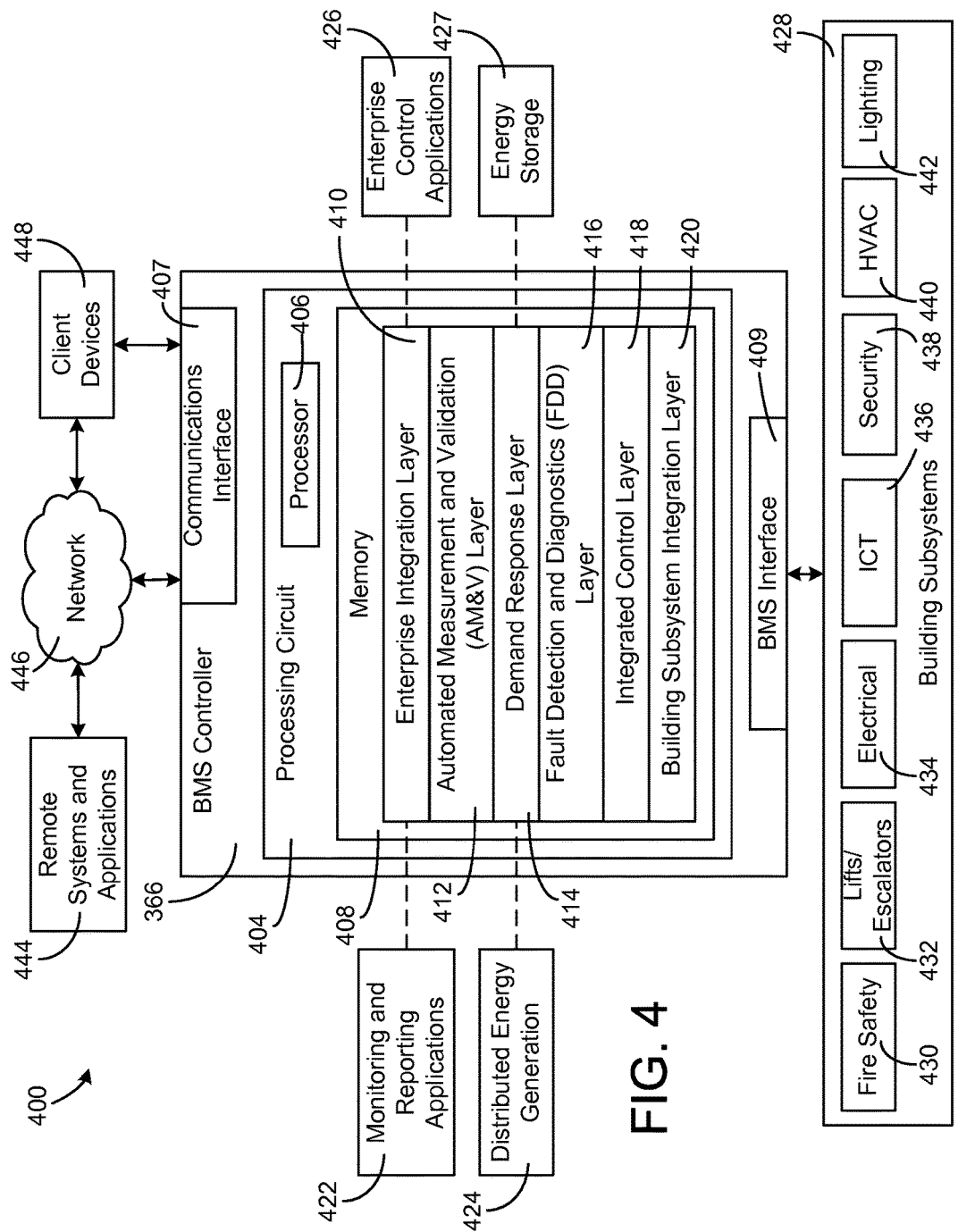
FIG. 4 is a block diagram illustrating a BMS which can be used in the building of FIG. 1, according to some embodiments.

Referring now to FIG. 4, a block diagram of a building management system (BMS) 400 is shown, according to an exemplary embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., locally wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, the interfaces 407, 409 can include a Wi-Fi transceiver for communicating via a wireless communications network. In another example, one or more of interfaces 407, 409 can include cellular or mobile phone communications transceivers. In one embodiment, communications interface 407 is a power line communications interface and BMS interface 409 is an Ethernet interface. In other embodiments, communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand set-point before returning to a normally scheduled set-point, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the set-point for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include set-point or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) can shut-down systems or direct control activities around faulty devices or systems to reduce energy waste, extend equipment life, or ensure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its set-point. These processes can be examined by FDD layer 416 to expose when the system begins to degrade in performance and alert a user to repair the fault before it becomes more severe.

Diagnostics in an Ethernet Network

The BMS, as described above, has multiple individual components within the BMS. Example components may include control devices, such as field equipment controllers (FECs), advanced application field equipment controllers (FACs), network control engines (NCEs), input/output modules (IOMs), and variable air volume (VAV) modular assemblies. However, other control device types are contemplated. For example, the BMS may include multiple devices such as sensors, actuators, valves, beacons, switches, thermostats, etc. In some embodiments, some or many of these devices may be configured as or connected to a network and controlled through that network. For example, the network may be an Ethernet network arranged in a ring topology. The present disclosure describes a mechanism to easily and efficiently identify malfunctioning devices on a network. In that regard, the present disclosure describes a frame with a count field that is transmitted by a media redundancy manager to a number of media redundancy clients configured to be controlled by the media redundancy manager. The media redundancy manager and the number of media redundancy clients are arranged in a ring topology, such as an Ethernet ring. The count field is updated as the frame is transmitted from one media redundancy client to another media redundancy client around the Ethernet ring. Eventually, the frame is received back by the media redundancy manager. Based on the received message, the media redundancy manager first determines whether the Ethernet ring is open or closed. Then, in an open Ethernet ring, the media redundancy manager identifies the identity of the faulted devices from the count field of the frame, as discussed in greater detail below.

Figure 5:
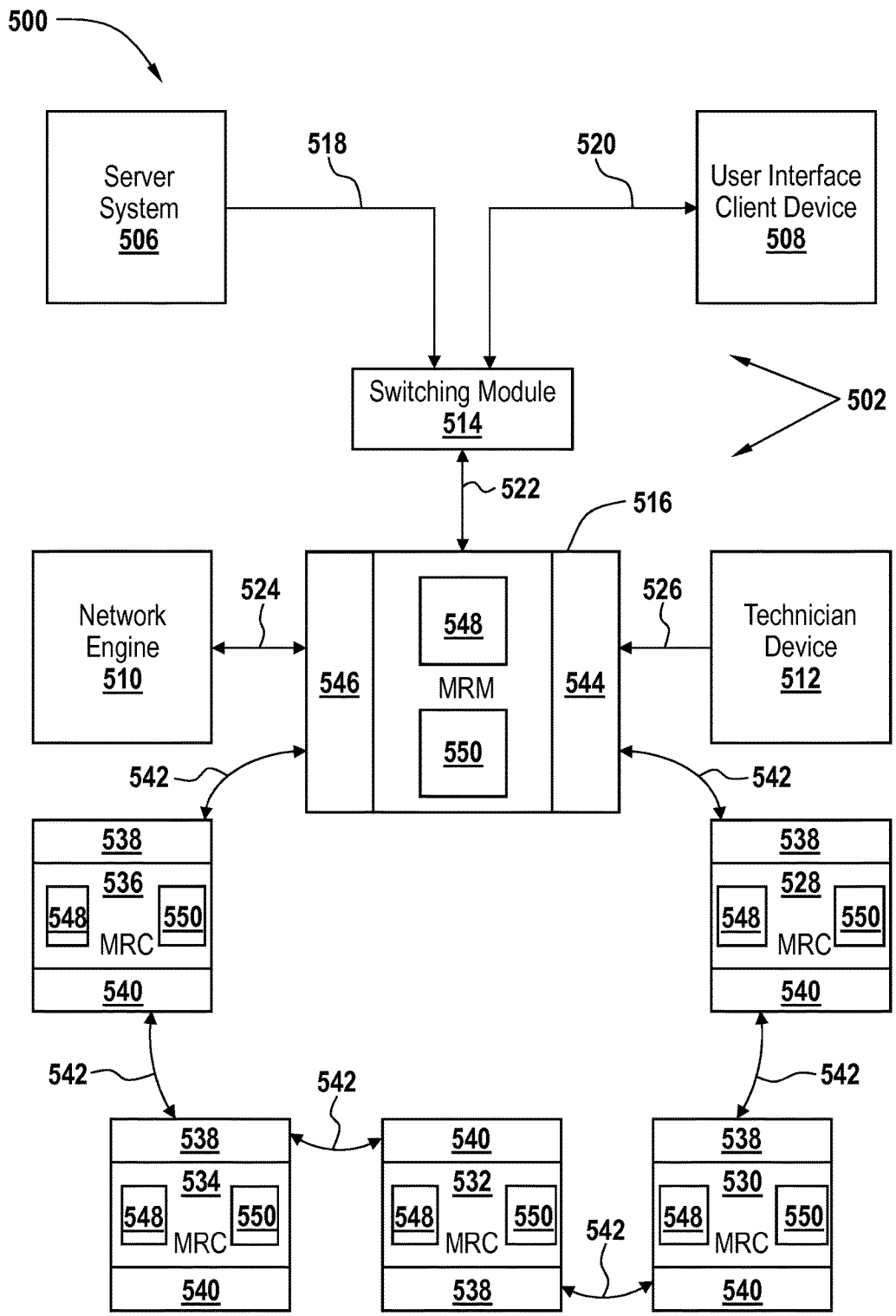
FIG. 5 is a block diagram illustrating an Ethernet network connected to a plurality of devices, according to some embodiments.

Referring now to FIG. 5, a block diagram illustrating a system 500 is shown, according to some embodiments. As depicted, the system 500 includes a number of devices 502 connected to a network 504. The devices 502 may be part of the BMS described above, or used in conjunction or combination therewith to control, manage, or otherwise handle various operations in the BMS. In at least some embodiments, the devices 502 include a server system 506, a user interface client device 508, a network engine 510, and a technician device 512. In at least some embodiments, the server system 506 may be a BMS server system in communication with the BMS controller 366 for running a variety of building controls, such as those described above. Likewise, in some embodiments, the user interface client device 508 may be used to interact and instruct the server system 506 (and the BMS controller 366) to perform a variety of operations. Furthermore, the network engine 510 may be used in conjunction with the server system 506 to control and manage individual devices in the BMS. For example, the server system 506 (and the BMS controller 366) may receive an instruction (e.g., to reduce the temperature of a certain portion of the building 10) from the user interface client device 508. The server system 506 may transmit that request to the network engine 510, which in turn may communicate with the network 504 to control one or more devices (e.g., thermostats) connected on that network, as discussed below. The technician device 512 in turn may be used to control the network 504, as well as to manage a switching module 514. The technician device 512 may be used to control and manage other devices as well in the system 500.

Additionally, one or more of the devices 502 may be connected either directly or indirectly through the switching module 514 to a manager device 516 of the network 504. For example, the server system 506 and the user interface client device 508 are connected to the switching module 514 via communication links 518 and 520, respectively, and the switching module is in turn connected to the manager device 516 through a communication link 522. In contrast, the network engine 510 and the technician device 512 may be directly connected to the manager device 516 via communication links 524 and 526, respectively.

Although the server system 506 and the user interface client device 508 are connected indirectly to the manager device 516, in other embodiments, the server system 506 and the user interface client device 508 may be connected directly to the manager device 516. Likewise, while the network engine 510 and the technician device 512 are connected directly to the manager device 516, in some embodiments, the network engine 510 and the technician device 512 may be connected to the manager device 516 via a switching module (e.g., the switching module 514). Additionally, notwithstanding the devices 502 in FIG. 5, the system 500 may include more or fewer of devices, as required. Furthermore, each of the devices 502 may in turn be connected to other devices or systems associated with the BMS (not shown).

The communication links 518, 520, 522, 524, 526 may be any of a variety of communication channels or interfaces. Specifically, the communication links 518, 520, 522, 524, 526 may be of any type that are suitable for communicating with the types of devices provided in the devices 502 and with the manager device 516. For example, one or more of the communication links 518, 520, 522, 524, 526 may be wired communication links (e.g., jacks, antennas, transmitters, receivers, transceivers, wire terminals, electrical cables and connectors, etc.) and communicate via wired communication protocols, such as TCP/IP, BACnet IP, BACnet MSTP, CAN, Modbus, USB, Firewire, UART, SPI, RS-485, or other wired protocols. One or more of the communication links 518, 520, 522, 524, 526 may instead be wireless and communicate via one or more wireless communication protocols, such as Wi-Fi (including TCP/IP), Wi-Max, Bluetooth, LoRa, NFC, Zigbee, and the like. In some embodiments, the communication links 518, 520, 522, 524, 526 may include cellular or mobile phone communications, wireless radio channels, local area network (LAN), metropolitan area network (MAN), wide area network (WAN), world wide web, and the like. A combination of one or more communication interfaces discussed above may be used for the communication links 518, 520, 522, 524, 526 as well, in some embodiments.

Furthermore, although only a single switching module (e.g., the switching module 514) has been described in FIG. 5, in at least some embodiments, the number and type of the routing devices in the system 500 may vary. For example, in some embodiments, multiple switching modules may be used to route communications to the manager device 516. In other embodiments, other types of routing devices, such as, hubs, routers, bridge routers, other types of bridges, integrated services digital network (ISDN), may be used instead of or in addition to the switching module 514. A combination of various routing mechanisms may be desirable in certain configurations.

Referring still to FIG. 5, in some embodiments, the network 504 is an Ethernet (TCP/IP) network arranged using a ring topology (Ethernet ring). However, other network types configured in a ring topology are contemplated. Additionally, while the figures show a network arranged in a ring topology, other network topologies are also contemplated. Thus, in at least some embodiments, the network 504 is configured as an Ethernet ring having a closed loop configuration. Further, in at least some embodiments, the network 504 utilizes media redundancy protocol (MRP). It is to be understood that only those aspects of MRP that are needed for a proper understanding of the present disclosure are described herein. Nevertheless, several other features of MRP that are commonly applicable to Ethernet networks and, particularly to Ethernet rings, are contemplated and considered within the scope of the present disclosure. As described herein, MRP is configured to be implemented in the first layer (physical layer), second layer (data link layer), or a combination of the first and second layers of the open systems interconnection (OSI) model.

MRP, which is defined in the International Electrotechnical Commission (IEC) standard 62439-2, is typically used for industrial network applications, such as industrial automation systems and BMSs. MRP is a recovery protocol, which provides for continuous (or substantially continuous) operation of devices on the network 504 by avoiding single points of failures. Specifically, MRP provides for redundancy in the network 504 to allow reconfiguration of the Ethernet ring during operation without interruption of network traffic. By virtue of providing redundancy in the network 504, MRP facilitates a fault-free to low-fault operation of the Ethernet ring. MRP may also be used for diagnostics purposes. For diagnostic purposes, MRP may be used to quickly identify malfunctioning devices in the network 504 and to perform maintenance on those devices, as discussed in greater detail below in FIGS. 7-10.

Thus, the network 504, which is configured to operate on MRP, includes the manager device 516 and a plurality of media redundancy clients (MRC) 528, 530, 532, 534, and 536. When using MRP, the manager device 516 is configured as a media redundancy manager (MRM). As used herein, the terms "manager device" and "media redundancy manager (MRM)" are used interchangeably. By virtue of using MRP, one or more of the MRCs 528, 530, 532, 534, 536 may be removed from the network 504 at any time and additional MRCs may be added to the Ethernet ring at any time without disrupting network traffic. As shown, the MRCs 528, 530, 532, 534, 536 are connected to each other in a closed loop configuration. Thus, the MRC 530 is connected directly to the MRC 528 on one side and to the MRC 532 on the other side. Similarly, the MRCs 532 and 534 are each connected to two other MRCs on either side. In contrast to the MRCs 530, 532, and 534, which are connected to another MRC on either side, the MRCs 528 and 536 are connected on one side to the MRM 516 and to the MRCs 530 and 534, respectively, on the other side.

Furthermore, all of the MRCs 528, 530, 532, 534, 536 are capable of receiving and sending information in both directions (e.g., from left to right and from right to left, as shown in FIG. 5). To that end, each of the MRCs 528, 530, 532, 534, 536 includes two ports—a first input/output port 538 and a second input/output port 540. Each of the first and second input/output ports 538 and 540, respectively, may have a specific address within the MRCs 528, 530, 532, 534, 536 such that either of the first and the second input/output ports may be used to communicate to and/or from the MRC. Additionally, the MRCs 528, 530, 532, 534, 536 are connected to one another and, either directly or indirectly through other MRCs to the MRM 516, via communication links 542.

The communication channels between the MRCs 528, 530, 532, 534, 536 and between the MRCs and the MRM 516, may be designated as primary channels or secondary channels. In general, the communication within the network 504 occurs via the primary channels, but when one of the MRCs fails, the MRM 516 may instantaneously (or substantially instantaneously) reconfigure the primary and secondary communication channels to bypass the failed MRC. Likewise, these primary and secondary communication channels may facilitate adding and removing the MRCs 528, 530, 532, 534, 536 from the network 504 by allowing the MRM 516 to reconfigure the communication channels to either include added MRCs or bypass deleted MRCs. The MRM 516 may also have the capability to decide which communication channels are designated as primary communication channels and which ones as secondary communication channels.

Although only five of the MRCs 528, 530, 532, 534, 536 and one of the MRM 516 have been shown in the network 504, this can vary in other embodiments. For example, in some embodiments, as many as one hundred, two hundred, or possibly greater number of the MRCs may be provided. In other embodiments, fewer than one hundred or possibly even fewer than five of the MRCs may be used. Likewise, a number of the MRMs 516 may be used in other embodiments.

Furthermore, in some embodiments, multiple instances of the network 504 may be provided, if desired. Such multiple networks may each have one or more of the MRCs 528, 530, 532, 534, 536 and one or more of the MRM 516 and each of the networks may communicate with each other or be independent of one another. Further, each of the multiple networks may be configured as Ethernet rings, or possibly configured as other types of networks. Thus, various configurations of the devices 502 and the network 504 are contemplated and considered within the scope of the present disclosure. In addition, other devices and systems that are typically present in an Ethernet ring topology are also contemplated and considered within the scope of the present disclosure.

With specific reference to the MRM 516, the MRM may be configured to monitor and/or control the MRCs 528, 530, 532, 534, 536, to determine faults in the network 504, and to react to those faults (e.g., by re-routing network traffic through alternate channels, generating alerts to address faults, etc.). In at least some embodiments, the MRM 516 also includes one or more ring or switch ports through which the MRM 516 can send information to, and receive information from, the MRCs 528, 530, 532, 534, 536. For example, the MRM 516 includes a first input/output port 544 and a second input/output port 546. Each of the first and the second input/output ports 544 and 546 is able to both send and receive information from the MRCs 528, 530, 532, 534, 536 (e.g., via the first and second input/output ports 538 and 540). In other embodiments, multiple input/output ports may be provided for either or both of the first and the second input/output ports 544 and 546, respectively, of the MRM 516. In addition to managing the MRCs 528, 530, 532, 534, 536, the MRM 516 also facilitates communication of the MRCs with the devices 502, either directly or via the switching module 514. In at least some embodiments, the MRM 516 may be based on hardware that is suitable for performing the functions described herein.

Referring still to FIG. 5, in at least some embodiments, each of the MRCs 528, 530, 532, 534, 536 may be a variable modular device capable of performing one or more specific functions. For example, in the context of BMS, the MRCs 528, 530, 532, 534, 536 may include thermostats, dampers, individual components of the HVAC 100, the waterside system 200, the airside system 300, and/or the BMS controller 366. The MRCs 528, 530, 532, 534, 536 may also include components that are not specifically part of the HVAC 100, the waterside system 200, the airside system 300, or the BMS controller 366, but are needed for the proper operation of those systems or work in conjunction with those systems. For example, the MRCs 528, 530, 532, 534, 536 may be input/output modules for communicating with one or more devices. When used as an input/output module, the MRCs 528, 530, 532, 534, 536 may be connected to the devices 502 on one end via the MRM 516 and to other input/output or peripheral devices on the other end. In those cases, the MRCs 528, 530, 532, 534, and 536 may transmit information to the input/output or peripheral devices from the devices 502, as well as transmit information back to the devices 502 from the input/output or peripheral devices.

In addition to the input/output ports described above, both the MRM 516 and the MRCs 528, 530, 532, 534, 536 include additional hardware. For example, either or both of the MRM 516 and the MRCs 528, 530, 532, 534, 536 may include memory or storage capability 548. When present, the memory 548 may include one or more devices (e.g., memory units, memory devices, storage devices, etc.) for storing data and/or computer code for completing and/or facilitating various processes described in the present disclosure. The memory 548 may include volatile and/or non-volatile memory including, random access memory (RAM), read-only memory (ROM), dynamic random access memory (DRAM), programmable read only memory (PROM), erasable programmable read only memory (EPROM), electrically erasable programmable read only memory (EEPROM), flash memory, hard drive storage, optical memory, or any other suitable memory for storing data, software objects and/or computer instructions. The memory 548 may also include database components, object code components, script components, or any other type of information structure for supporting the various activities and information structures described in the present disclosure. Other types of storage media, for example, compact disc (CD), digital video disc (DVD), floppy discs, Blu-ray discs, magnetic storage, computer readable media, or other electronic storage media, may be used within or in conjunction with the memory 548 of the MRM 516 and the MRCs 528, 530, 532, 534, 536.

The memory 548 may be communicably connected to a processing circuit 550 of the MRM 516 and the MRCs 528, 530, 532, 534, 536. The processing circuit 550 may be capable of executing computer code for running one or more processes described herein. In some embodiments, the processing circuit 550 may include a digital signal processor (DSP), such as, a general-purpose stand alone or embedded processor, or a specialized processing circuit. In at least some embodiments, multiple instances of the processing circuit 550 may be connected together at least indirectly and utilized in combination with one another to perform various functions described herein. Likewise, the processing circuit 550 may be equipped to communicate with the memory 548, as well as a variety of input or output devices, such as, audio recorders, video recorders, monitors, and printers. The processing circuit 550 may also be equipped with direct memory access (DMA) modules to drive various communication links (e.g., the communication links 518, 520, 522, 524, 526, and 542) particularly when those ports are synchronized serial ports.

Furthermore, the processing circuit 550 may be configured to process a variety of program instructions and data, in accordance with the present disclosure. In at least some embodiments, the MRM 516 includes MRP program instructions and specifically MRP program instructions suitable for operating as a manager. Similarly, each of the MRCs 528, 530, 532, 534, 536 include MRP program instructions for instructing those devices to operate as clients and to participate in the network 504. Moreover, these program instructions and data need not always be digital or composed in any high-level programming language. Rather, the program instructions may be any set of signal-producing or signal-altering circuitry or media that may be capable of performing functions, described in the present disclosure. Furthermore, the processing circuit 550 may be located either in the general vicinity of the MRM 516 and the MRCs 528, 530, 532, 534, 536, or alternatively may be located at a remote location or a cloud for communicating with the MRM 516 and the MRCs 528, 530, 532, 534, 536.

Other types of storage, processing, input, and/or output devices, or combinations thereof, that are commonly employed in processing circuits (e.g., the processing circuit 550) configured for use as a MRM or MRC, are contemplated and considered within the scope of the present disclosure. It is also to be understood that the capabilities of the MRM 516 in terms of the storage, processing, and other needs may vary from that of the MRCs 528, 530, 532, 534, 536. Thus, the memory 548 and the processing circuit 550 of the MRM 516 may be configured differently from the memory and the processing circuit of the MRCs 528, 530, 532, 534, 536. Furthermore, the MRM 516 and the MRCs 528, 530, 532, 534, 536 may include other hardware, software, and firmware components that are commonly present in devices configured as MRM and MRC and running MRP in an Ethernet network configured in a ring topology. With respect to the communication links 542, each of those links may be similar to the communication links 518, 520, 522, 524, 526 to the extent that those interfaces are suitable for MRP and for communication in an Ethernet ring. Other types of communication channels suitable for Ethernet communications may be used as well.

Figure 6A:
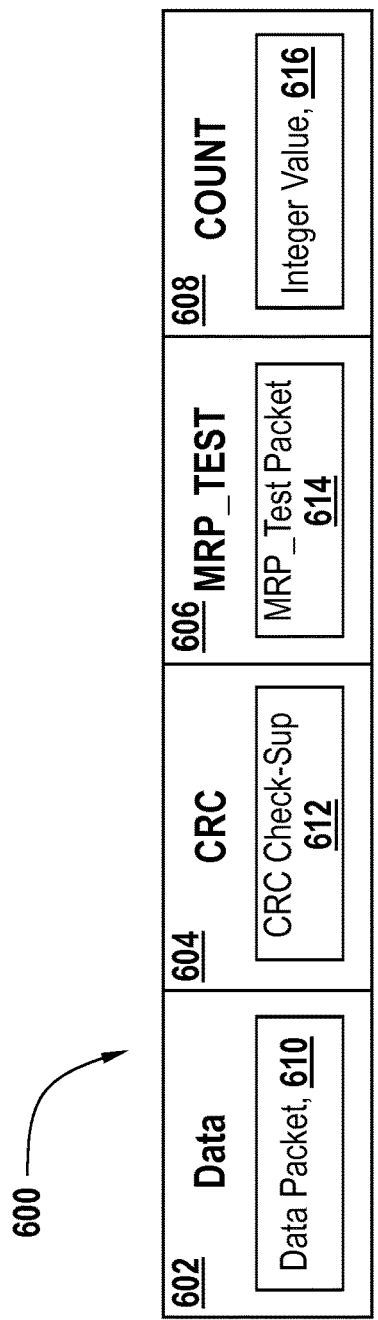
FIG. 6A is a block diagram illustrating a data frame that may be transmitted by a manager device on the Ethernet network of FIG. 5, according to some embodiments.
Figure 6B:
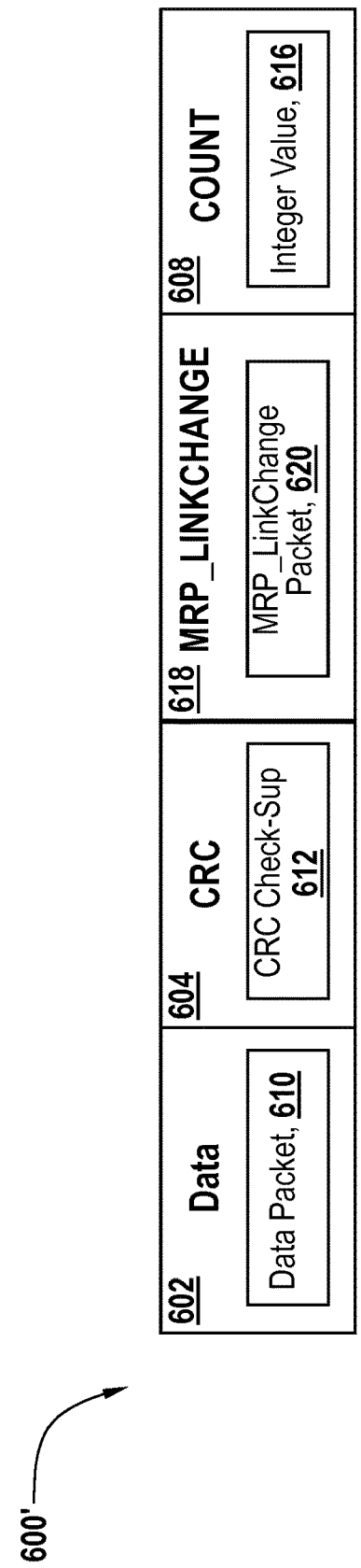
FIG. 6B is a block diagram illustrating another data frame that may be transmitted on the Ethernet network of FIG. 5, according to some embodiments.

Turning now to FIGS. 6A and 6B, a number of frames 600 and 600' that may be transmitted or sent by the MRM 516 are shown, according to some embodiments. As used herein, the frames 600 and 600' may also be referred to as a "beacon," "data frame," or "diagnostic frame." The frames 600 and 600' are a combination of a sequence of bits and/or symbols transmitted by the MRM 516 to determine which of the MRCs 528, 530, 532, 534, 536, if any, are faulted. "Faulted," as used herein, means that the "faulted" one of the MRCs 528, 530, 532, 534, 536 is malfunctioning in some way (e.g., incapable of performing its designated operation or function in any way, or is incapable of communicating with other devices, either on the network 504 or outside thereof, with which the MRC is designed to communicate). As discussed below, an instance of the frames 600 and 600' may be transmitted by the MRM 516 on the first input/output port 544 and/or on the second input/output port 546 of the MRM. The frames 600 and 600' that are transmitted on the first input/output port 544 of the MRM 516 may have somewhat different information than the frames that are transmitted on the second input/output port 546 of the MRM 516. For example, the frames 600 and 600' that are transmitted on the first input/output port 544 of the MRM 516 may have one or more bits configured to indicate that those frames are transmitted on the first input/output port of the MRM 516. Similarly, the frames 600 and 600' that are transmitted on the second input/output port 546 of the MRM 516 may have one or more bits configured to indicate that those frames are transmitted on the second input/output port 546 of the MRM 516. One instance of the frames 600 or 600' that is broadcast by the MRM 516 may be deemed as one unit of data transmission. In some embodiments, the MRM 516 may be designed to transmit a plurality of frames on either the first input/output port 546 or the second input/output port 546.

Referring specifically to the frame 600 of FIG. 6A now, the frame typically conveys a variety of information and may include one or more "fields." For example and as depicted, the frame 600 may include a data field 602, a cyclic redundancy check (CRC) field 604, an MRP_test field 606, and a count field 608. The data field 602 is represented herein by a data field value 610. The data field 602 may include a variety of information such as source and destination network addresses (e.g., media access control (MAC) addresses), sequencing and control information, any data to be conveyed to the MRCS 528, 530, 532, 534, 536, overall length of the frame 600, information regarding data prioritization, hop counts or time-to-live, unique identifiers to identify a particular Ethernet ring when the MRM 516 is managing multiple Ethernet rings, etc. Additionally, any other information that may be deemed necessary for the proper transmission and operation of the frame 600 in the network 504 may be included in the data field 602.

The CRC field 604 is a cyclic error detecting code typically inserted into the frame 600 to detect accidental changes in the transmission of the frame as the frame travels from a source device to a destination device. The CRC field 604 may be represented as a combination of bits and/or symbols, referred to herein as CRC Check-Sup 612. While the frame 600 has been described as having an instance of the CRC field 604, in at least some embodiments, the frame 600 may include other or additional forms of error detecting codes. In some embodiments, it may be desirable to not include an error detecting code at all in the frame. In those cases, the CRC field 604 may not be inserted in the frame 600. In yet other embodiments, the CRC field 604, or any other error detecting code that is used, may be included as part of the data field 602.

With respect to the MRP_test field 606, the actual value of the MRP_test field is represented herein as an MRP_test packet 614. Like the data field 602 and the CRC field 604, the MRP_test field 606 is a combination of bits and/or symbols. The MRP_test field 606 may identify the type of message to be conveyed by the frame 600. For example, the MRP_test field 606 may identify that the MRM 516 is running a diagnostic and that the frame 600 is a diagnostic frame designed to determine whether the network 504 is open or closed and whether any of the MRCs 528, 530, 532, 534, 536 on the Ethernet ring have faulted. The network 504 is deemed "closed" when all of the MRCs 528, 530, 532, 534, 536 are functioning properly and no faults are detected in the Ethernet ring. The network 504 is deemed "open" when at least one of the MRCs 528, 530, 532, 534, 536 has faulted. Any other information that may be necessary to convey the type of message in the frame 600 to determine whether the network 504 is open or closed, as well as to identify any faulted ones of the MRCs 528, 530, 532, 534, 536 may be included in the MRP_test field 606.

By virtue of knowing the identity of at least some of the faulted ones of the MRCs 528, 530, 532, 534, 536, the MRM 516 can generate alerts to have the faulted MRCs fixed or replaced. In some cases, as discussed below, if two non-consecutively placed MRCs 528, 530, 532, 534, and 536 are faulted, the MRM 516 can determine the identity of the faulted MRCs on either end, and the MRM can further determine how many of the MRCs in between the faulted MRCs are off-line, even if not faulted. Thus, the MRM 516 not only controls and monitors the MRCs 528, 530, 532, 534, and 536 on the network 504 to reconfigure the Ethernet ring in case of an open status, the MRM 516 can also specifically determine if at least some of the MRCs are faulted and need attention. Such a functionality is particularly beneficial in Ethernet rings that have several MRCs (e.g., fifty or more) where it may not be feasible to manually inspect each of the MRCs in the Ethernet ring to determine whether those devices are functioning properly or not.

Furthermore, as mentioned above, MRCs may be added to or subtracted from the network 504 at any time. As the number of MRCs increases in the network 504, the Ethernet ring may become overloaded. Without the diagnostic feature of the present disclosure, it is practically impossible to determine whether the network 504 is overloaded or not, particularly when the Ethernet ring has a greater number (e.g., fifty or more) of MRCs to begin with. As will be discussed below, the diagnostic features of the present disclosure may be used to quickly identify if the network 504 is overloaded (e.g., when too many MRCs are being added to the network 504).

The MRM 516 is configured to perform these diagnostic functions by using a count field 608 in the frame 600. The count field 608 is represented by an integer value 616. When the frame 600 is transmitted from the MRM 516, the count field 608 is set to a value of zero. As the frame 600 is transmitted from one MRC to another in the network 504, the value of the count field 608 is incremented. Specifically, each one of the MRCS 528, 530, 532, 534, 536 increments the value of the count field 608 by one before transmitting the frame 600 to the next MRC in the network 504. Thus, when the MRM 516 receives the frame 600 back, by looking at the value of the count field 608, the MRM can determine whether the Ethernet ring (e.g., the network 500) is overloaded or not. For example, the MRM 516 may be pre-programmed with a threshold number of MRCS. If the value of the count field 608 is greater than the pre-programmed threshold, then the MRM concludes that the network 504 is overloaded and may generate an alert. Therefore, by reviewing the count field 608, the MRM 516 may continuously keep track of the number of MRCS on the network 504 and prevent the network ring from overloading or in some cases, becoming unstable.

Also, by looking at the value of the count field 608 in conjunction with the port from which the frame 600 is sent and received, the MRM 516 can determine whether the ring is open or closed, and if open, which one or more of the MRCS 528, 530, 532, 534, 536 are faulted. This functionality is described further below with respect to FIGS. 7-10. Although the count field 608 has been described as having a value of zero when the frame 600 is transmitted initially from the MRM 516, in at least some embodiments, the count field may have a value of greater than zero. Likewise, in some cases, each of the MRCS 528, 530, 532, 534, 536 may be configured to increment the value of the count field 608 by greater than one. In both the above examples, the MRM 516 may be configured to calculate the exact value of the count field 608 when the MRM receives the frame 600 back. Furthermore, although the count field 608 has been shown as being part of the frame 600, in at least some embodiments, the count field may be a frame in itself, separate from the frame 600 and appended to the frame 600 during transmission.

Turning now to FIG. 6B and referring to FIG. 6B in conjunction with FIG. 6A, the frame 600' is shown, in accordance with at least some embodiments of the present disclosure. The frame 600' is similar to the frame 600. For example, the frame 600' also includes the data field 602, the CRC field 604, and the count field 608. However, instead of the MRP_test field 606, the frame 600' includes a MRP_LinkChange field 618. The MRP_LinkChange field 618 may be inserted, if not initially, then at some point during transmission. The MRP_LinkChange field 618 may be represented by a value MRP_LinkChange 620. The MRP_LinkChange field 618 may be used to indicate hardware error or failure of certain ones of the MRCs 528, 530, 532, 534, 536. The MRP_LinkChange field 618 may be generated by one or more of the MRCs 528, 530, 532, 534, 536 to indicate that communication with a neighboring one of the MRCs has changed. Similar to the MRP_test field 606, the MRP_LinkChange field 618 may include a count field. In at least some embodiments, the MRCs 528, 530, 532, 534, 536 may keep track of the relative number of frames with the MRP_test field 606. If the count of the frames received from the first input/output port 538 of the MRCs 528, 530, 532, 534, 536 differs substantially from the count of the second input/output port 540 of the MRCs, the MRCs then know that at least one of the MRCs on the network 504 is not forwarding the frame. In that event, the MRCs 528, 530, 532, 534, 536 with differing count values may generate the MRP_LinkChange field 618, such that the frame 600 becomes the frame 600'. Specifically, when the MRP_LinkChange field 618 is generated, the MRP_LinkChange field may discard the MRP_test field 606 from the frame 600, and copy the count field 608 associated with the discarded MRP_test field into the MRP_LinkChange field to keep track of the number of MRCs on a particular branch or subset of the network 504. Thus, a frame includes either the MRP_test field 606 (as shown in the frame 600) or the MRP_LinkChange field 618 (as shown in the frame 600').

Furthermore, at any given time, each of the MRCs 528, 530, 532, 534, 536 has received about the same number of frames (with the MRP_test field 606) at each of its first and second input/output ports 538 and 540, respectively. If no frames are received at one of the ports, then the count values in the frames received from the first and second input/output ports 538 and 540, respectively, become unbalanced. The MRCs 528, 530, 532, 534, 536 can sense this problem. Therefore, the frame 600' with the MRP_LinkChange field 618 may be used so that only two of the MRCs 528, 530, 532, 534, 536 report an error, and the two that report are on either side of the part of the network 504 that has gone offline or opened. Thus, if any of the MRCs 528, 530, 532, 534, 536 receive the MRP_LinkChange field 618 with a frame, then it zeroes the left count and right count so that the difference between the counts on the first input/output port 538 and the second input/output port 540 is zero. The zero difference prevents additional detections of the same error. Thus, every one of the MRCs 528, 530, 532, 534, 536 on the network 504 can figure out its position on the network by comparing the count value observed in the MRP_Test fields received from the first and second input/output ports. The MRCs 528, 530, 532, 534, 536 near the MRM 516 may delay reporting errors so that the first report comes from the MRCs that are situated farthest from the MRM 516 and therefore closest to the break in the network 504.

While the various fields of the frame 600 and the frame 600' have been described above as having certain attributes, it is to be understood that the information conveyed by those fields may vary in other embodiments. In at least some embodiments, the frames 600 and 600', and possibly each of the individual fields in those frames may include headers and limiters to identify the beginning and end of each field and the beginning and end of the frame. Any additional information that is necessary for the transmission and functioning of the frames 600 and 600' as intended or deemed desirable to include in the frames may be added as well.

Figure 7:
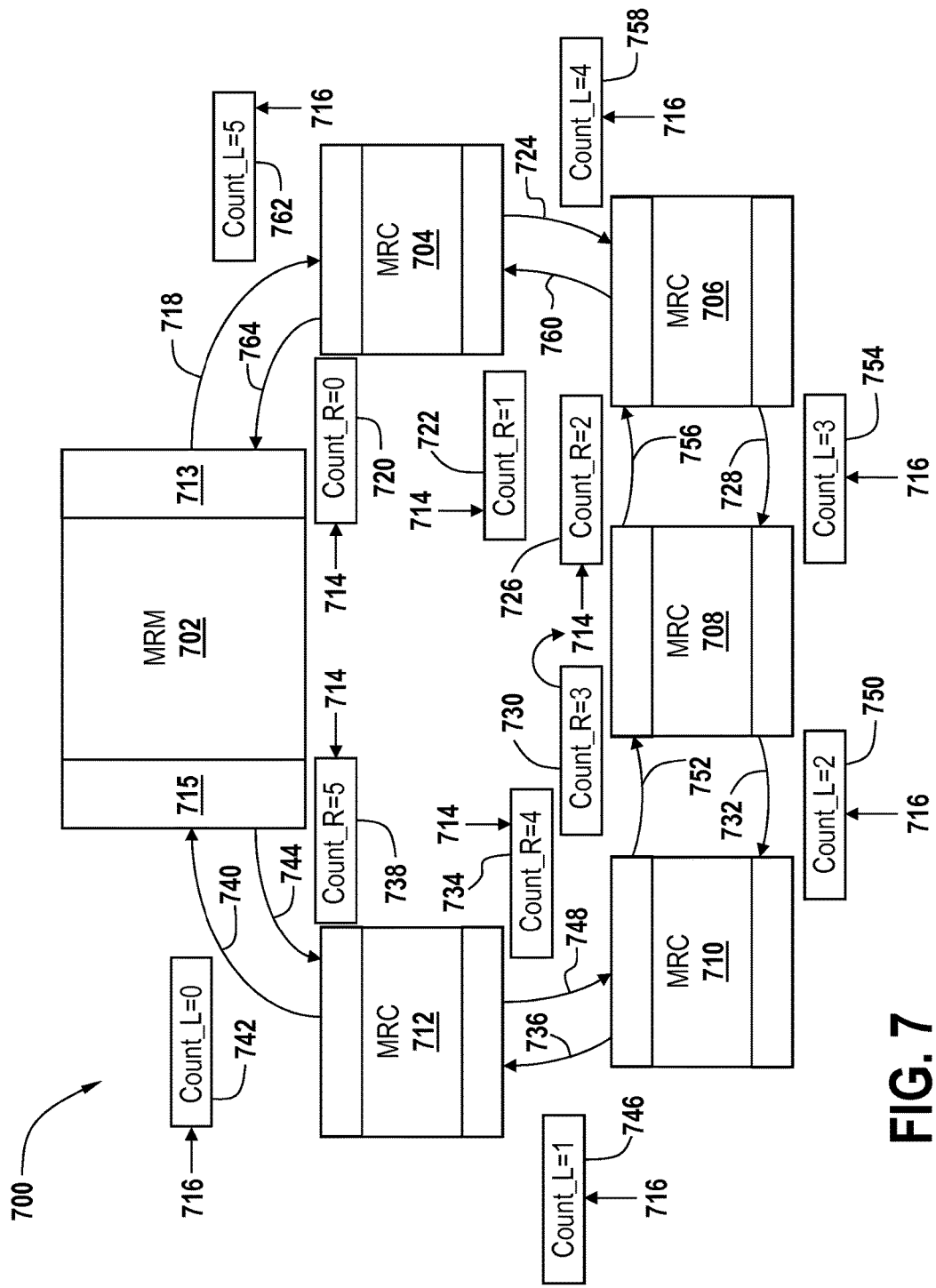
FIG. 7 is a flow diagram illustrating a diagnostic flow to establish that the Ethernet network of FIG. 5 is in a closed status, according to some embodiments.

Referring now to FIG. 7, a flow diagram in a closed Ethernet ring 700 is shown, according to some embodiments. As discussed above, the Ethernet ring 700 is "closed" when all of the MRCs on the Ethernet ring are functioning properly and communicating with other MRCs and the MRM in the Ethernet ring. As with the network 504, the Ethernet ring 700 includes an MRM 702 and MRCs 704, 706, 708, 710, and 712. The MRM 702 is similar to the MRM 516 and the MRCs 704, 708, 710, 712 are similar to the MRCs 528, 530, 532, 534, 536, respectively. To determine whether the Ethernet ring 700 is open or closed, the MRM 702 transmits a frame (e.g., the frame 600) over the Ethernet ring 700 to one or more of the MRCs 704, 706, 708, 710, 712. To determine the status (e.g., open or closed) of the Ethernet ring 700, the type of message (represented by the MRP_test field 606) that is transmitted by the MRM 702 may be a test or diagnostic message.

Furthermore, one instance of the frame is transmitted on first input/output port 713 of the MRM 702 as frame 714 and another instance of the frame is transmitted on second input/output port 715 of the MRM as frame 716. For purposes of explanation only, the frames 714 and 716 only show the value of the count field (e.g., the count field 608). Furthermore, the representation of the frames 714 and 716 shown in FIG. 7 is exemplary. Again, for purposes of explanation only, the frame 714, which is transmitted from the first input/output port 713 of the MRM 702 is represented by Count_R. Likewise, the frame 716, which is transmitted from the second input/output port 715 of the MRM 702 is represented by Count_L.

When the MRM 702 decides to run a diagnostic on the Ethernet ring 700, the MRM transmits the frame 714 to the MRC 704, which is closest to the MRM and directly in communication with the first input/output port 713 of the MRM via communication link 718. At the time of transmission, the MRM 702 sets the value of the count field to zero. This is depicted in FIG. 7 by frame 720 as Count_R=0. When the MRC 704 receives the frame 720 from the MRM 702, if the MRC 704 is operable and able to communicate with the adjoining MRC 706, the MRC 704 increments the value of the count (Count-R=1) and transmits frame 722 via communication link 724 to the MRC 706.

Similarly, if the MRCS 706, 708, and 710 are each operable and functioning properly, the MRCS receive the frame from an adjoining MRC that most recently incremented the count, and the receiving MRC then increments the count, and forwards the frame with the incremented count to the next MRC in the network ring. Thus, the MRC 706 transmits frame 726 (Count_R=2) along communication link 728 to the MRC 708, which in turn transmits frame 730 (Count_R=3) via communication link 732 to the MRC 710. Likewise, the MRC 710 increments the count and transmits frame 734 (Count_R=4) to the MRC 712 via communication link 736. The MRC 712 also increments the count and transmits frame 738 (Count_R=5) back to the left port of the MRM 702 via communication link 740.

Therefore, the frame 714 makes a complete circuit around the Ethernet ring 700 when the ring is closed. Specifically, when the Ethernet ring 700 is closed, the frame 714, which the MRM 702 sent from the first input/output port 713 is received back at the MRM 702 on the second input/output port 715. By receiving the frame 714 on different ports, the MRM 702 knows that the frame 714 has completed a full circuit around the Ethernet ring 700 and that the ring is therefore closed. Moreover, in a closed ring, the count value is equal to the number of MRCs on the Ethernet ring 700 (as each MRC is only incrementing the count by one). Therefore, by looking at the count value, the MRM 702 can determine how many MRCs are connected to the Ethernet ring 700 and if the ring is overloaded.

At the same (or similar) time that the MRM 702 transmits the frame 714 from the first input/output port 713, the MRM also transmits the frame 716 from the second input/output port 715. The frame 716 is transmitted from the MRM 702 as frame 742 with a count of zero (Count_L=0). The frame 742 is sent to the MRC 712, which is directly connected to the MRM 702 via communication link 744. If the ring is closed, each of the MRCs 712, 710, 708, 706, and 704 receive the frame from the MRC that most recently incremented the count, the receiving MRC increments the count by one, and then forwards the frame with the incremented count to an adjoining MRC. Therefore, the MRC 712 receives the frame 742, increments the count (Count_L=1) and forwards frame 746 to the MRC 710 via communication link 748. Similarly, the MRC 710 increments the count (Count_L=2) and transmits frame 750 via communication link 752 to the MRC 708, which in turn transmits frame 754 with the incremented count (Count_L=3) via communication link 756 to the MRC 706. The MRC 706 then increments the count (Count_L=4) and transmits frame 758 via communication link 760 to the MRC 704, which then transmits frame 762 with the incremented count (Count_L=5) back to the MRM via communication link 764.

Thus, the MRM 702, which previously transmitted the frame 716 on the second input/output port 715 receives the frame back on the first input/output port 713. Again, by virtue of sending the frame 716 on one port and receiving the frame back on the other port, the MRM 702 knows that the frame has completed a full circuit around the Ethernet ring 700 and that the Ethernet ring is closed. In at least some embodiments, the frames 714 and 716 may be transmitted by the MRM 702 periodically or instantaneously when the previous frame is received back. The period within which to transmit the frames may be pre-determined and may range from a few milliseconds to a few seconds. Furthermore, in at least some embodiments, the MRM 702 may determine that it is not desirable to transmit either the frame 714 or the frame 716 in a particular cycle to determine whether the Ethernet ring 700 is closed or not.

Figure 8:
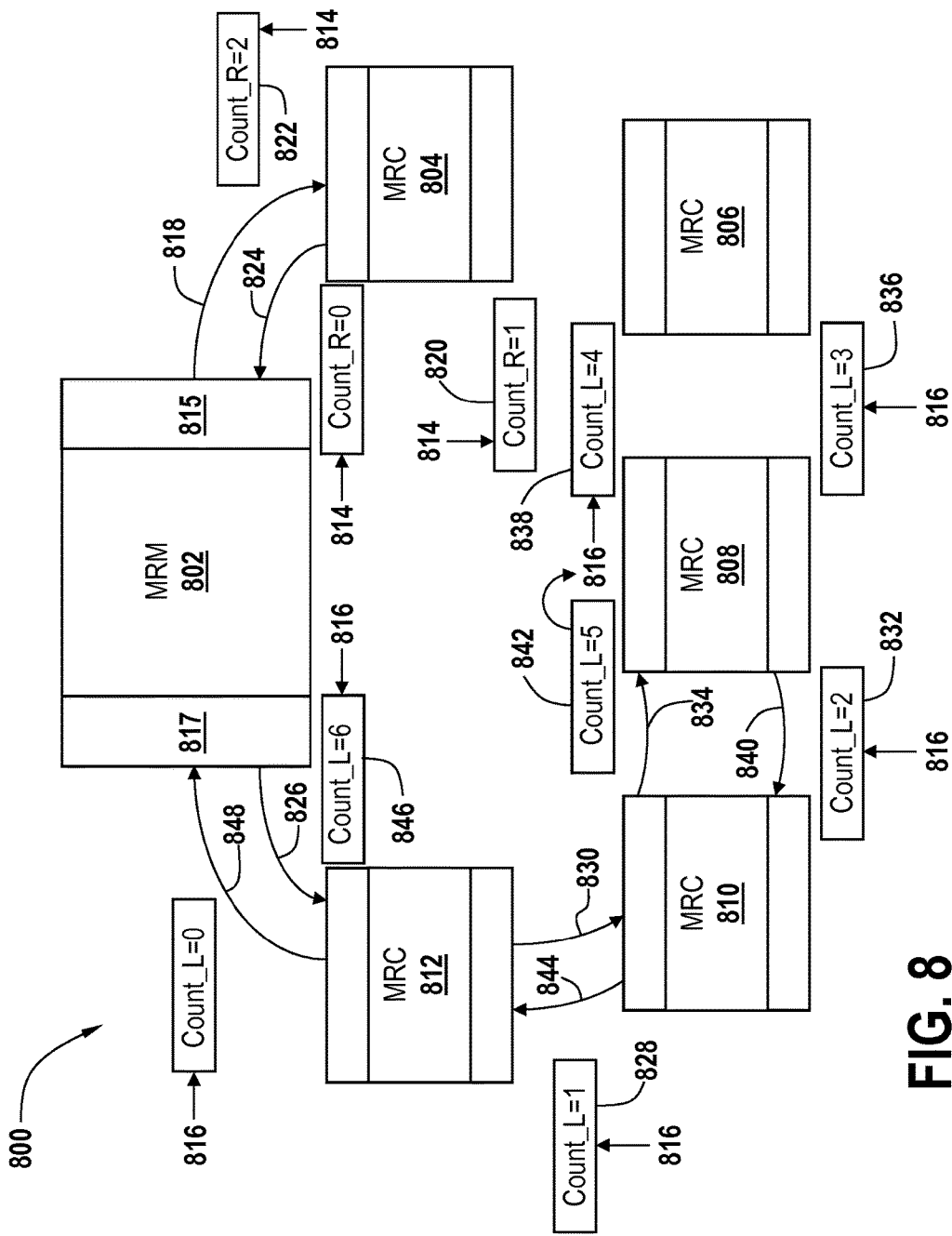
FIG. 8 is a flow diagram illustrating a diagnostic flow to establish that the Ethernet network of FIG. 5 is in an open status, according to some embodiments.
Figure 9:
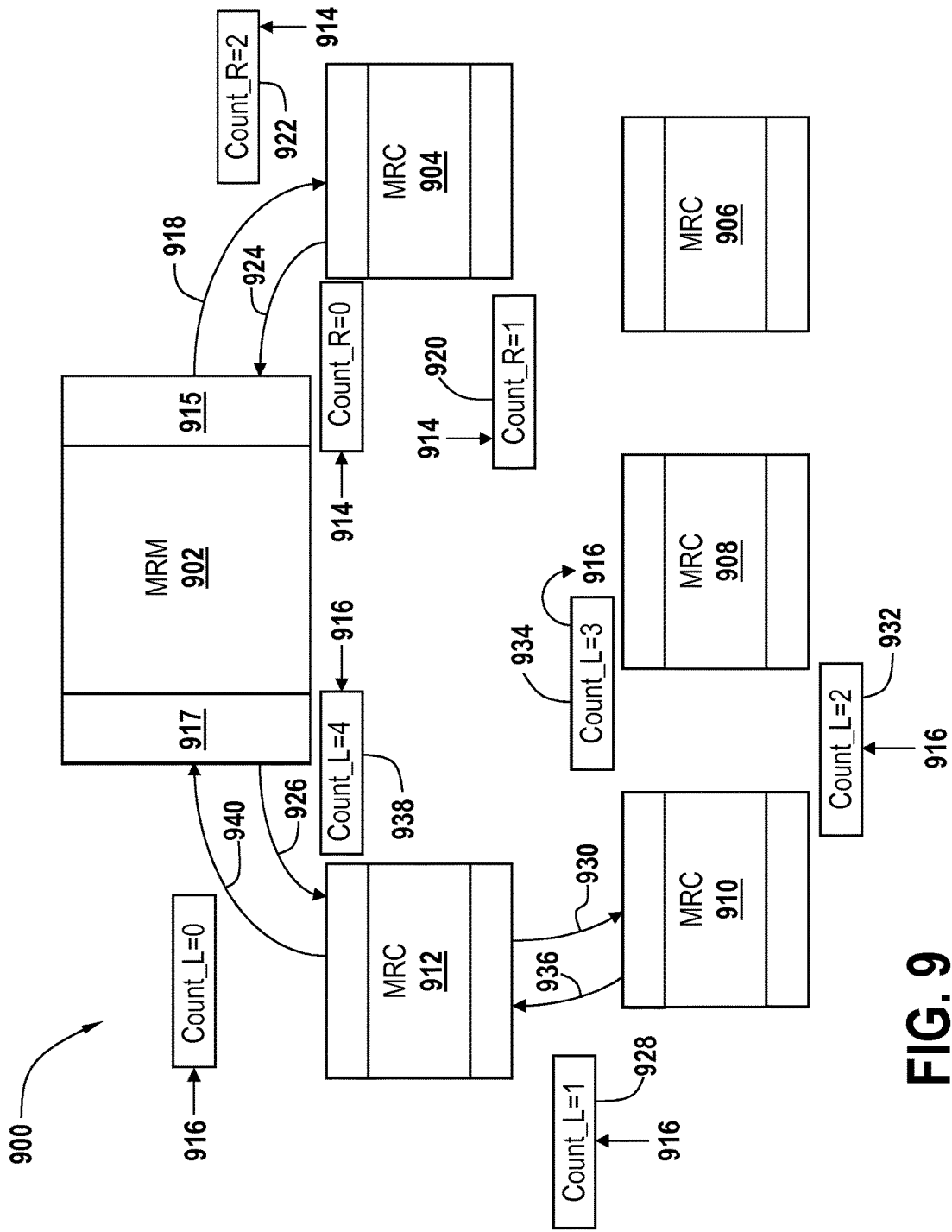
FIG. 9 is another flow diagram illustrating a diagnostic flow to establish that the Ethernet network of FIG. 5 is in an open status, according to some embodiments.

Turning now to FIGS. 8 and 9, Ethernet rings 800 and 900 are shown, according to some embodiments. Both of the Ethernet rings 800 and 900 depict open rings. Specifically, the Ethernet ring 800 depicts the diagnostic functionality of the MRM 516 when only one of the MRCs in the Ethernet ring is faulted, while the Ethernet ring 900 depicts the diagnostic functionality when additional MRCs are also faulted. Referring specifically to FIG. 8 now, the Ethernet ring 800 includes MRM 802 and MRCs 804, 806, 808, 810, and 812. The MRM 802 is similar to the MRM 516 and the MRCs 804, 806, 808, 810, 812 are similar to the MRCs 528, 530, 532, 534, 536, respectively. FIG. 8 depicts the diagnostic functionality of the MRM 802 when the MRC 806, for example, is faulted. As discussed above, a faulted MRC would lead to an open Ethernet ring.

Similar to FIG. 7, the MRM 802 transmits a frame 814 on a first input/output port 815 and a frame 816 on a second input/output port 817 with a count value of zero (Count_R=0 and Count_L=0). The frame 814 from the first input/output port 815 of the MRM 802 is transmitted via communication link 818 to the MRC 804. The MRC 804 increments the count (Count_R=1) and attempts to forward frame 820 with the incremented count to the MRC 806, which is the MRC directly adjoining the MRC 804. Since the MRC 806 is faulted, that MRC is unable to receive communications from the MRC 804 and the transmission of the frame 820 from the MRC 804 to the MRC 806 fails. Having failed to transmit, the MRC 804 again increments the count (Count_R=2) and transmits the frame 814, including the frame 820, as frame 822, back to the device (whether MRC or MRM) immediately preceding the MRC 804 on the Ethernet ring 800. As shown in FIG. 8, the device immediately preceding the MRC 804 on the Ethernet ring 800 is the MRM 802. Thus, the MRC 804 transmits the frame 822 back to the MRM via communication link 824. The MRM 802 receives the frame 822 on its first input/output port 815—the same port from which it sent out the frame 814. Further, the frame 822 has a count value that has been incremented twice by the MRC 804.

By virtue of receiving the frame 814 back on the same port from which the frame is sent, the MRM 802 can determine that the frame 814 did not complete a full circuit around the Ethernet ring 800, and that therefore the Ethernet ring 800 is open. The MRM 802 can also evaluate the count value of the received frame (e.g., the count value of the frame 822) and determine from that value which one of the MRCS 804, 806, 808, 810, 812 is faulted. Specifically, since the value of the count is set to zero when the frame 814 is sent from the MRM 802, and since each MRC increments the value of the count by one if forward transmitting, and by two if transmitting to a preceding device (also referred to herein as "reverse sending"), the MRM can divide the value of the count by two to determine which particular one of the MRC 804, 806, 808, 810, 812 has faulted when the Ethernet ring 800 is open. In this case, since the value of the count is two in the frame 822 that the MRM 802 receives back, the MRM divides the count by two to get a value of one. Thus, the MRM 802 can determine that only one MRC (e.g., the MRC 804 which received the frame 814 from the MRM) is operating and that the next MRC (e.g., the MRC immediately adjoining the MRC 804) is faulted. Therefore, the MRM 802 is able to specifically determine that the MRC 806 is faulted.

The MRM 802 is further able to determine the faulted MRC by way of the frame 816, which is transmitted from the second input/output port 817 of the MRM. Specifically and similar to the frame 814, the frame 816 is transmitted with a count value of zero (Count_L=0). The frame 816 is transmitted to the MRC 812 via communication link 826. The MRC 812 increments the count (Count_L=1) and forwards frame 828 on communication link 830 to the MRC 810. The MRC 810 again increments the count (Count_L=2) and transmits frame 832 via communication link 834 to the MRC 808. The MRC 808 increments the count (Count_L=3), but is unable to transmit frame 836 to the MRC 806, which has faulted. Similar to the MRC 804 then, the MRC 808 again increments the count (Count_L=4) and transmits frame 838 back to the MRC immediately preceding the MRC 808 on the Ethernet ring 800 via communication link 840. As shown in FIG. 8, the device immediately preceding the MRC 808 on the Ethernet ring 800 is the MRC 810. Upon receiving the frame 838, the MRC 810 also increments the count (Count_L=5) and transmits frame 842 back to the MRC 812 via communication link 844. The MRC 812 in turn increments the count (Count_L=6) and again reverse sends frame 846 via communication link 848 to the MRM 802.

Thus, the MRM 802 receives the frame 816 back on the same port (e.g., the second input/output port 817) from which that frame was transmitted. By virtue of sending and receiving the frame 816 from the same port, the MRM 802 is able to determine that the Ethernet ring 800 is open. Also, since each of the MRC have now incremented the count twice, by dividing the value of the count of the frame 846 by two, the MRM 802 can specifically determine which one of the MRC 804, 806, 808, 810, 812 has faulted. Since the frame 846 has a value of six when it is received by the MRM 802, by dividing the value of six by two, the MRM can determine that the first three MRCs closest to the second input/output port 817 of the MRM are operable and that the fourth MRC from the second input/output port has faulted. The fourth MRC from the second input/output port 817 of the MRM 802 is the MRC 806. Thus, the MRM 802 can particularly point out that the MRC 806 is faulted and can further generate alerts to have the MRC 806 fixed or replaced.

By virtue of using both, the frame 814 and the frame 816, to determine the faulted ones of the MRCs 804, 806, 808, 810, 812, the MRM can also successfully identify faulted MRCs when only one of the input/output ports of an MRC is faulted. Thus, for example, if the first input/output port of the MRC 806 in FIG. 8 is faulted, the MRC 804 will be unable to communicate with the MRC 806 and cause the MRM 802 to determine that the MRC 806 is faulted. However, if the second input/output port of the MRC 806 is functional, the MRC 808 may be able to communicate with the MRC 806. Thus, the MRC 808 may be able to transmit the frame 836 to the MRC 806. In this case, the MRC 806 may still not be able to transmit the frame 836 forward owing to its own faulted first input/output port. In at least some embodiments, the MRC 806 may reverse send the frame 836 back to the MRM 808 which originally transmitted the frame to the MRC 806. However, since the failure to transmit the frame 836 from the MRC 806 to the MRC 804 is necessitated not by any fault in the MRC 804, but rather a fault in the MRC 806 itself, the MRC 806 may not increment the count of the frame 836 when reverse sending that frame back to the MRC 808. The frame 836 may then make its way back to the MRM 808 as the frame 846, as described above. The MRM 802 may then be able to determine from the count that the MRC 806 is the faulted MRC even though the MRC 808 was able to communicate with the MRC 806.

Also, in FIG. 8, since only one of the MRCs (e.g., the MRC 806) is faulted, both, the frame 814 (from the right port) and the frame 816 (from the left port) point to the same faulted MRC. However, if multiple ones of the MRC are faulted, the frame 814 and the frame 816 point to different MRCs, enabling the MRM to determine how many of MRCs may be possibly faulted, as explained in FIG. 9 below.

In FIG. 9, the Ethernet ring 900 includes a MRM 902 and MRCs 904, 906, 908, 910, and 912. The MRM 902 is similar to the MRM 516, and the MRCs 904, 906, 908, 910, 912 are similar to the MRCs 528, 530, 532, 534, 536. In contrast to FIG. 8 in which only one MRC was faulted, in FIG. 9, two of the MRCs (the MRC 906 and 908) are faulted. It is to be understood that the number of MRCs shown as faulted in either FIG. 8 or FIG. 9 is exemplary. In other examples, any number of MRCs on the Ethernet ring 900, possibly including all of the MRCs on the Ethernet ring, may be faulted in some embodiments. Again, to run a diagnostic on the Ethernet ring 900, the MRM 902 transmits a frame 914 from first input/output port 915 and a frame 916 from second input/output port 917 with a count value of zero (Count_R=0; Count_L=0). The frame 914 with the zero count is transmitted via communication link 918 to the MRC 904. The MRC 904 increments the count (Count_R=1) and attempts to forward frame 920 with the incremented count to the MRC 906. Unable to forward the frame 920, the MRC 904 increments the count again (Count_R=2) and transmits frame 922 to the MRC (or the MRM 902 in this case) immediately preceding the MRC 904 on the Ethernet ring 900. Thus, the MRC 904 transmits the frame 922 with the double incremented count back to the MRM 902 via communication link 924.

Thus, the MRM 902 receives the frame 914 back on the same port (e.g., the first input/output port 915) from which the frame was transmitted and determines that the Ethernet ring 900 is open. To determine with specificity which one of the MRC 904, 906, 908, 910, 912 is faulted, the MRM 902 looks at the value of the count in the frame 922, divides that value by two, and calculates which one of the MRCS has faulted. Thus, since the count of the frame 922 was two, on dividing by two, the MRM 902 gets a value of one, which enables the MRM to determine that the first MRC (e.g., the MRC 904) from the first input/output port 915 of the MRM is functional and that at least the MRC (e.g., the MRC 906) next to the MRC 904 is faulted.

Similarly, the MRM 902 transmits the frame 916 from the second input/output port 917 with a count value of zero on communication link 926 to the MRC 912. The MRC 912 increments the count (Count_L=1) and forwards frame 928 via communication link 930 to the MRC 910. The MRC 910 again increments the count (Count_L=2) and attempts to transmit frame 932 to the MRC 908. Since the MRC 908 has faulted, that MRC is unable to receive the frame 932. Upon failing to send the frame 932 to the MRC 908, the MRC 910 again increments the count (Count_L=3) and transmits the frame 934 with the double increment back to the MRC 912 via communication link 936. The MRC 912 also increments the count (Count_L=4) and transmits the frame 938 back to the MRM 902 on communication link 940.

The MRM 902 receives the frame 938 on the second input/output port 917, which is the same port from which the frame 916 is transmitted in the first place. Having sent and received the frame 916 from the same port, the MRM 902 determines that the Ethernet ring 900 is open. Additionally, the MRM 902 divides the value in the count in the frame 938 by two to determine which of the MRCS 904, 906, 908, 910, 912 has faulted. Since the count value of the frame 938 is four, by dividing the count value by half, the MRM 802 gets a value of two. Again, the count value is divided by two since each of the MRCS (e.g., the MRC 912, 910) until the faulted MRC has incremented the count twice—once by transmitting the frames to the next MRC and once by transmitting the frames to the preceding MRCS. After dividing the count by two and attributing one count to each of the MRCS closest to the second input/output port 917 of the MRM 902, the MRM may calculate that the MRCS 912 and 910 are operational and that the MRC adjoining the MRC 910, to which the MRC 910 attempted to transmit and failed, is faulted. Thus, the MRM 902 determines that the MRC 908 is faulted.

Referring still to FIG. 9, the MRM 902 can evaluate the frame 922 and determine that at least the MRC 906 has faulted, and from the frame 938 that at least the MRC 908 has faulted. With that information, the MRM 902 can further determine that, in addition to the MRC 906 and 908, some or possibly all of the MRCs between those MRCs may be faulted as well. Further, the MRM 902 can determine that communication is not possible with the MRCs between MRC 906 and 908, via the Ethernet ring 900. It is possible that only the MRCs 906 and 908 have faulted and that all of the MRCs in between the MRCs 906 and 908 are operational. However, the MRM 902 has now identified a segment of the Ethernet ring 900 that is open and needs attention. This is particularly helpful in Ethernet rings with a large number of MRCs. Although in FIG. 9, no other MRCs are shown in between the MRC 906 and 908, in other implementations of the Ethernet ring 900, one or more MRC may be present in between two faulted MRCs.

Figure 10:
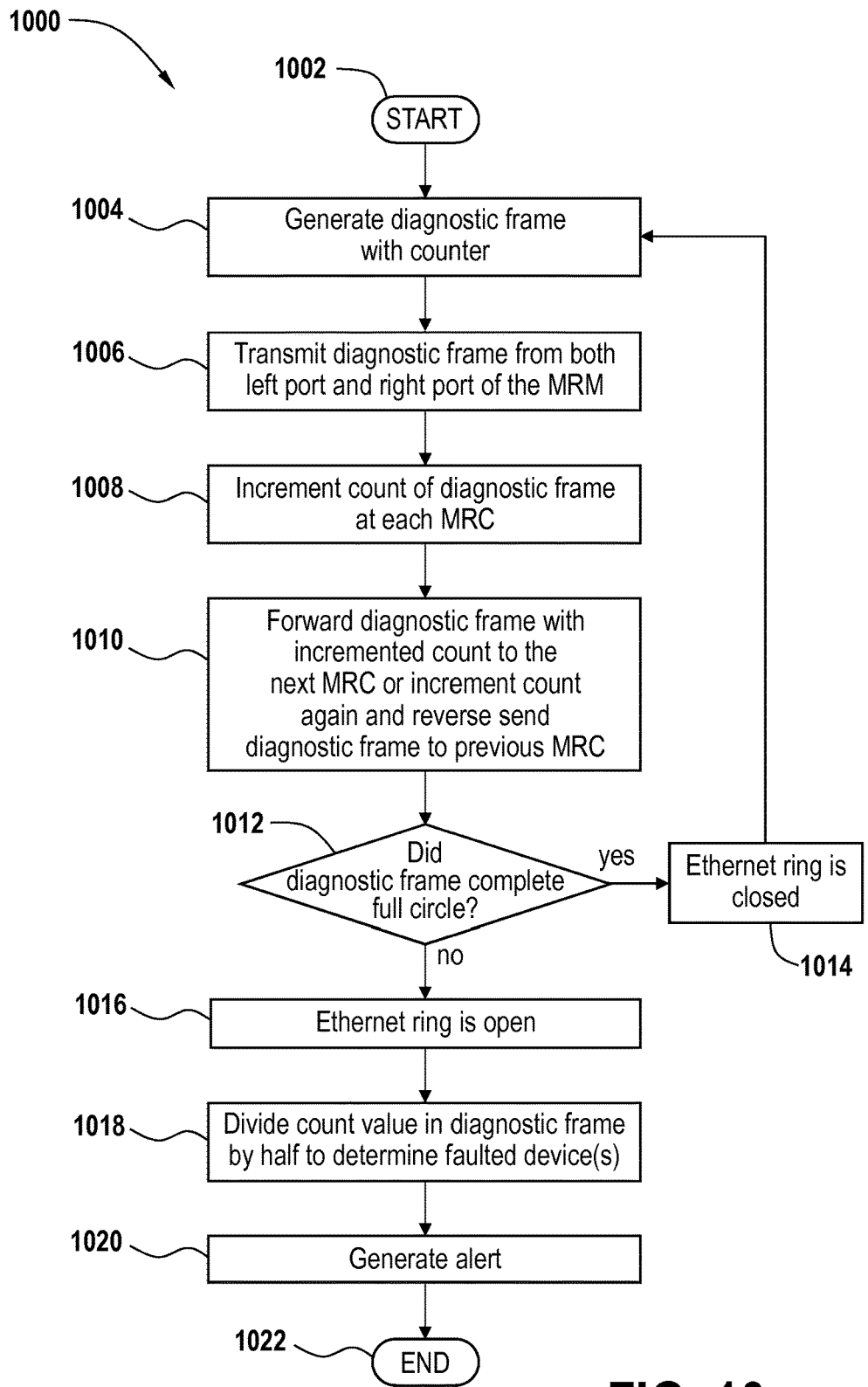
FIG. 10 is a flow chart illustrating a process flow for running diagnostics on the Ethernet network of FIG. 5, according to some embodiments.

Referring now to FIG. 10, an exemplary flowchart outlining a diagnostic process 1000 is shown, according to some embodiments. After starting the diagnostic process 1000 at process block 1002, the MRM (e.g., the MRM 516, 702, 802, 902) generates and transmits a diagnostic frame at process blocks 1004 and 1006, respectively. The diagnostic frame is distinguishable from other types of frames by virtue of having a "test" type message in the MRP_test field 606. The MRM transmits an instance of the diagnostic frame from the first input/output port and another instance of the diagnostic frame from the second input/output port. In at least some embodiments, the MRM transmits the diagnostic frame from the first input/output port and the second input/output port at the same or substantially same time. Furthermore, the MRM transmits the diagnostic frame with a count value of zero in the count field 608 field. The diagnostic frame is transmitted to the MRCs directly connected to the MRM on both the first and the second input/output ports. If one or both of the MRCs directly connected to the MRM are unable to receive the diagnostic frames, then the MRM determines that the MRC(s) is (are) unable to receive the diagnostic frames is (are) faulted and that the Ethernet ring is open.

If the MRCs are able to receive the diagnostic frames, the MRCs increment the count in the diagnostic frames, as indicated by process block 1008, and attempt to transmit the diagnostic frames with the incremented count to the next adjoining MRC. As indicated by process block 1010, the process of incrementing the count and forwarding the diagnostic frames with the incremented count continues until an MRC is unable to forward the diagnostic frame to a MRC, or until the diagnostic frame is received by the MRM. Once any MRC is unable to transmit the diagnostic frame forward, that MRC increments the count in the diagnostic frame one more time and starts reverse transmitting the diagnostic frame back to the adjoining MRC from which it originally received the diagnostic frame (e.g., the preceding MRC or the MRM if the preceding device is the MRM). Thus, each MRC is incrementing the count once when forward transmitting and twice when reverse transmitting. In either case, the diagnostic frame eventually comes back to the MRM. By determining whether the diagnostic frame returned on the same port as it was sent from, the MRM determines whether the Ethernet ring is open or close.

At process block 1012, the MRM reviews the received diagnostic frame and determines if the diagnostic frame that was sent from a particular input/output port returned back to the same input/output port or to a different input/output port. For example, if the MRM determines that the diagnostic frame sent from the first input/output port returned via the second input/output port and the diagnostic frame sent from the second input/output port returned via the first input/output port, the MRM determines that both instances of the diagnostic frames have completed a full circuit around the Ethernet ring, and that the Ethernet ring is closed, or in other words, operational. Furthermore, the count value of the diagnostic frames will be equal to the number of devices in the Ethernet ring, additionally validating that the Ethernet ring is closed. The determination of the Ethernet ring being in a closed state is documented by the MRM at process block 1014. Documentation of the Ethernet ring status may involve noting the status in a log, generating a signal and transmitting that signal to a personnel, resetting an alarm, or some other form of recording. In some embodiments, the MRM may be configured not to record the status of the Ethernet ring when the status indicates a closed ring. After determining and possibly documenting the closed status of the Ethernet ring, process 1000 returns to process block 1004 for the MRM to generate another diagnostic frame. The next diagnostic frame may be generated almost instantaneously as the MRM receives the previous diagnostic frame back or after a short time gap.

If at process block 1012, the MRM determines that the diagnostic frame is sent and received from the same input/output port, then the MRM concludes that the Ethernet ring is open. Specifically, if the MRM notes that the diagnostic frame that is transmitted from the first input/output port is also received back at the first input/output port and the diagnostic frame that is transmitted from the second input/output port is also received back at the second input/output port, then the MRM deems the Ethernet ring to be open and the process proceeds to process block 1016. At process block 1016, the MRM documents the open status of the Ethernet ring or, in some embodiments, skips the documentation and moves to process block 1018.

After concluding that the Ethernet ring is open, at process block 1018, the MRM runs additional diagnostics to determine which one or more of the MRCS have faulted causing the open status of the Ethernet ring. Specifically, the MRM reviews the count value in the diagnostic frames received back on the first input/output port and the second input/output port to specifically determine the location or positioning of the faulted devices. More specifically, if the diagnostic frame started out with a count of zero and if each MRC is configured to increment the count once when forward transmitting and again once when reverse transmitting, the MRM knows that each MRC has twice incremented the count in an open Ethernet ring. Thus, the MRM divides the count value by two to determine how many of the MRCS closest to the input/output port from which the diagnostic frame was received back are operational. By knowing which ones of the MRCS are operational, the MRM determines that the MRC immediately adjoining the last operational MRC has faulted.

As discussed above, by virtue of using the diagnostic frames from both the first input/output port and the second input/output port, the MRM can determine whether only one MRC has faulted or if more than one MRC has faulted. After determining the faulted MRC(s), the MRM may generate an alert at process block 1020. Again, the alert may involve logging the status in a log book, generating an alert signal to personnel, sounding alarms, shutting down of certain devices, some other action, or a combination of the above. Process 1000 ends at process block 1022 with the MRM generating another diagnostic signal at process block 1004.

Thus, the present disclosure provides a diagnostic capability based on the MRP to not only determine if the Ethernet ring is open or closed, but also to determine which of the MRCs on the Ethernet ring are potentially causing the open status of the Ethernet ring. The count in the diagnostic frame can identify the number of devices connected to the Ethernet ring and, therefore, whether the Ethernet ring is overloaded and overworked. The count in the diagnostic frame can also be used to determine faulted MRCs in the Ethernet ring and enable personnel to perform maintenance or other operations on the faulted device(s). These diagnostics may ensure a smoother operation of the Ethernet ring and the diagnostics can minimize downtimes of faulted MRCs in the Ethernet ring, making the Ethernet ring more reliable. The quick identification of the faulted MRCs also enables personnel charged with maintaining the Ethernet ring to be more efficient in maintaining the faulted MRCs.

Additional Embodiments

Figure 11:
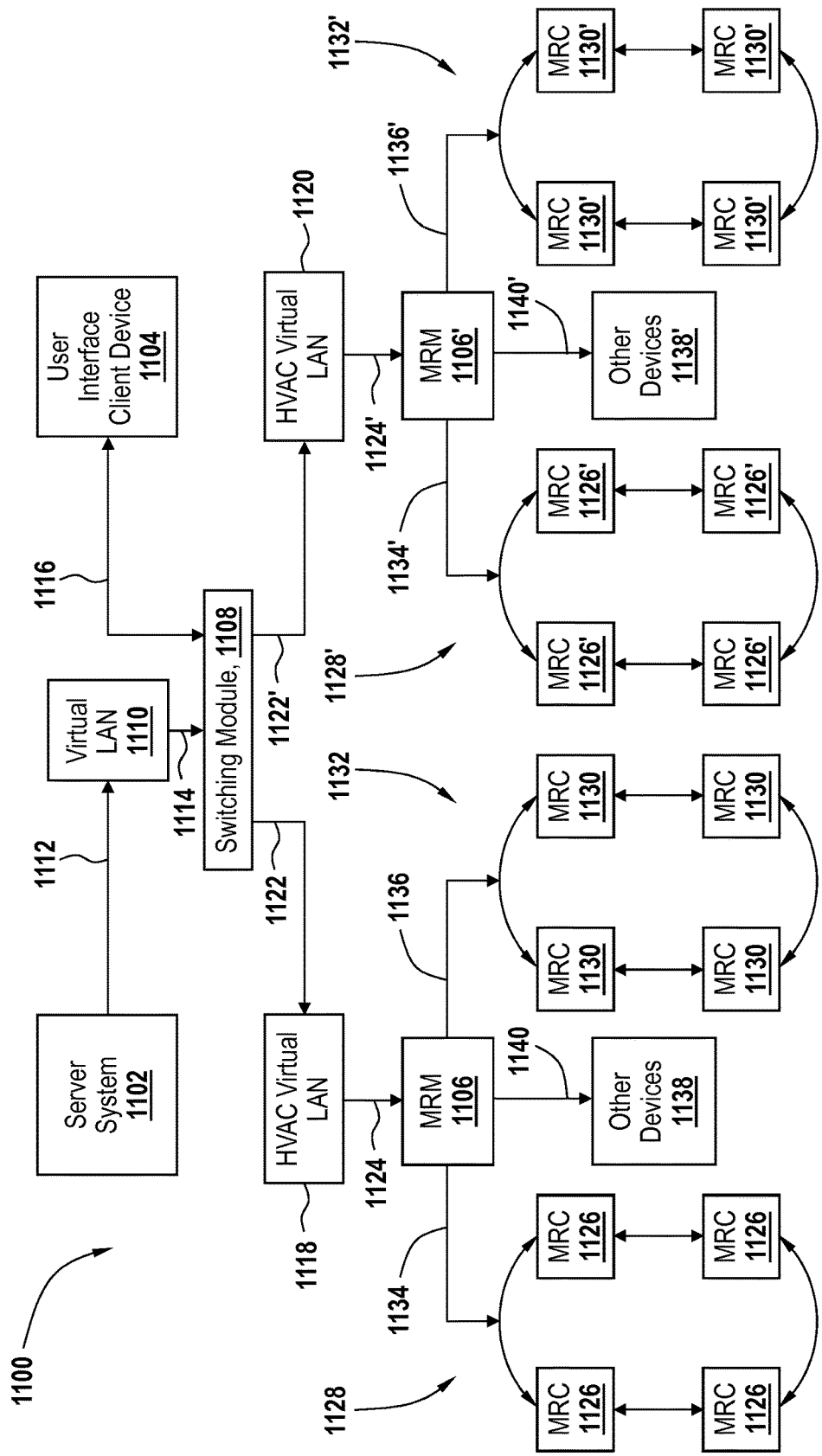
FIG. 11 is a block diagram illustrating another Ethernet network connected to a plurality of devices, according to some embodiments.

Referring now to FIG. 11, a system 1100 is shown, according to example embodiments. The system 1100 includes, similar to the system 500 of FIG. 5, a server system 1102, a user interface client device 1104, and device managers 1106, 1106' (also referred to herein as media redundancy managers (MRM)). The server system 1102 is connected to a switching module 1108 via a virtual local area network (VLAN) device 1110 and communication links 1112 and 1114. The user interface client device 1104 is also connected to the switching module 1108 via communication link 1116. The switching module 1108 is additionally connected to the device manager 1106 via HVAC VLAN device 1118, as well as communication links 1122 and 1124. Likewise, the switching module 1108 is connected to the device manager 1106' via HVAC VLAN device 1120 and communication links 1122' and 1124'.

In some embodiments, the server system 1102 may be similar to the server system 506, the user interface client device 1104 may be similar to the user interface client device 508, and the switching module 1108 may be similar to the switching module 514. Notwithstanding the fact that the server system 1102 is connected to the switching module 1108 via the VLAN device 1110, in other embodiments, the server system may be directly connected to the switching module or via another type of networking device. Furthermore, although not shown, the server system 1102 may be connected to other devices as well, such as, hosted user interfaces, BMS controllers, BMS devices, etc. Likewise, although the user interface client device 1104 is connected directly to the switching module 1108, in at least some embodiments, the user interface client device may be connected to the switching module via the VLAN device 1110 or another networking device. Additionally, although the switching module 1108 is connected to the device manager 1106 via the HVAC VLAN device 1118 and to the device manager 1106' via the HVAC VLAN device 1120, in at least some embodiments, the switching module may be connected directly to the device managers or via another networking device. In yet other embodiments, the switching module 1108 may be connected to the device managers 1106, 1106' via either one of the HVAC VLAN devices 1118 or 1120.

Moreover, similar to the system 500, the device managers 1106 and 1106' are configured to manage a plurality of client devices (also referred to herein as media redundancy clients (MRC)). For example, the device manager 1106 is configured to manage a plurality of client devices 1126 arranged in a first ring 1128, and a plurality of client devices 1130 arranged in a second ring 1132. Additionally, the device manager 1106 manages the first ring 1128 via communication link 1134 and the second ring 1132 via communication link 1136. The device manager 1106 is further connected to manage other devices 1138, as indicated by communication link 1140. Similarly, the device manager 1106' is configured to manage a plurality of client devices 1126' arranged in a first ring 1128' and a plurality of client devices 1130' arranged in a second ring 1132'. The device manager 1106' manages the first ring 1128' via communication link 1134' and the second ring 1132' via communication link 1136'. Furthermore, the device manager 1106' is configured to manage other devices 1138', as indicated by communication link 1140'.

The device managers 1106 and 1106' are similar to the MRM 516 and the plurality of client devices 1126, 1126', 1130, and 1130' are similar to the MRCS 528, 530, 532, 534, 536. Furthermore, the management and operation of the first rings 1128, 1128' and the second rings 1132, 1132' by the respective device managers 1106 and 1106' is similar to the management of the MRCS 528, 530, 532, 534, 536 by the MRM 516 using the Media Redundancy Protocol (MRP), as described in regards to FIG. 5. above. Notwithstanding the fact that the device managers 1106, 1106' are shown as managing the first ring 1128, 1128' and the second ring 1132, 1132', in at least some embodiments, the device manager may be configured to manage additional or fewer rings. Furthermore, the number of client devices within each ring may vary from one embodiment to another, with each ring having a same or different number of client devices. In some embodiments, additional device managers 1106, 1106' may be used as well to manage each ring. Furthermore, although two instances of the device managers 1106 and 1106' are shown with each device manager managing two rings (e.g., the first ring 1128, 1128', and 1130, 1130'), in other embodiments, additional or fewer instances of the device managers, with each device manager managing one or more rings, may be provided.

Additionally, although not shown, each of the device managers 1106, 1106', and the plurality of client devices 1126, 1126', 1130, and 1130' include input and output ports, memory and processing circuits, as well as other components (hardware, software, firmware, and associated logic) that may be needed to communicate with the other client devices within the ring and with the device manager. The other devices 1138, 1138' that are managed by the device managers 1106, 1106', respectively, may include, in at least some embodiments, network engines, technician devices, routers or other networking devices, ring coordinators, or any other device that is deemed suitable for being managed by the device manager. Further, in at least some embodiments, the other devices 1138, 1138' may include a sub-device manager configured to assist the device managers 1106, 1106', respectively, with the management of the respective plurality of client devices 1126, 1130, and 1126', 1130'.

Similar to the MRM 516 and the MRCs 528, 530, 532, 534, 536 described above, the device managers 1106, 1106' and the plurality of client devices 1126, 1126', 1130, and 1130' are configured to transmit and receive frames having a count field. As discussed above, the count field may be used to determine if one or more of the plurality of client devices 1126, 1126', 1130, and 1130' are faulted.

Figure 12:
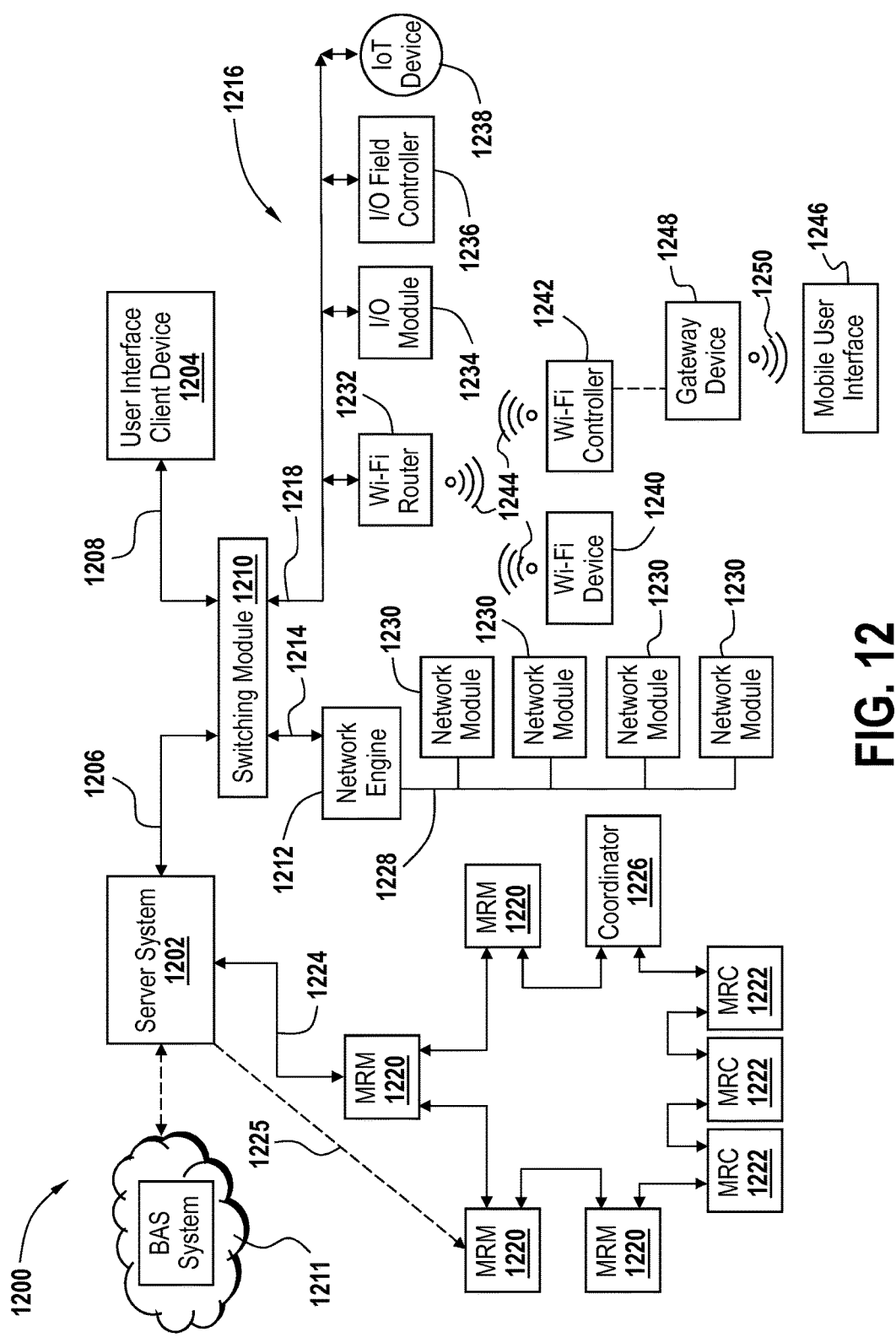
FIG. 12 is a block diagram illustrating yet another Ethernet network connected to a plurality of devices, according to some embodiments.

Turning now to FIG. 12, a system 1200 is shown, according to some embodiments. Similar to the systems 500 and 1100, the system 1200 includes a server system 1202 and a user interface client device 1204 connected via communication links 1206 and 1208, respectively, to a switching module 1210. The server system 1202 and the user interface client device 1204 are similar to the server system 506, 1102, and the user interface client device 508, 1104, respectively. Although not shown, either or both of the server system 1202 and the user interface client device 1204 may be connected to the switching module 1210 via one or more networking devices (e.g., a VLAN device). In at least some embodiments, the server system 1202 may be in a two way communication (e.g., using a secure communication channel based on the HTTPS protocol) with a building automation system (BAS) 1211. In one embodiment, the BAS 1211 may be a cloud based BAS. In other embodiments, the BAS 1211 may be installed within one or more BAS controllers, or within a BMS. By virtue of communicating with the BAS 1211, the server system 1202 may have access to various user interfaces, and may be able to provide remote site access, multi-site management, long term repository storage, and energy and equipment analytics. Thus, the server system 1202 may provide a centralized integration platform for a variety of devices and equipment (e.g., IP/IoT devices and equipment).

The switching module 1210 may be connected to a network engine 1212 via communication link 1214 and other devices 1216 via communication link 1218. The network engine 1212 is similar to the network engine 510. In at least some embodiments, the other devices 1216 may include Ethernet and wireless field controllers, mobile user interfaces, third party Internet of Things (IoT) devices, etc., as discussed in more detail below. The switching module 1210 may control a variety of devices and equipment, allowing them to co-exist on a single network. Specifically, the switching module 1210 may control multiple devices and other equipment via the network engine 1212, the server system 1202, the user interface client device 1204, and other devices 1216. Although not shown, the switching module 1210 may include one or more managed switches to facilitate communication between the server system 1202, the user interface client device 1204, the network engine 1212, and the other devices 1216.

Furthermore, the system 1200 includes a device manager 1220 (also referred to herein as a media redundancy manager (MRM)). The device manager 1220 is similar to the MRM 516 and the device manager 1106, and is configured to manage a plurality of client devices 1222 (also referred to herein as media redundancy clients (MRC)). However, in contrast to the MRM 516, which is connected at least indirectly to the switching module 514, the device manager 1220 is connected to the server system 1102 via communication link 1224. By virtue of being connected to the server system 1202, the server system may be able to manage a variety of devices including the network engine 1212 and the other devices 1216 by utilizing the device manager 1220 and the plurality of client devices 1222 directly without having to route communications through the switching module 1210. Thus, the server system 1202 may be able to obtain a faster response time from the device manager 1220 and the plurality of client devices 1222. The server system 1202 may also be able to leverage the advantages of Ethernet and IP without having to incur substantial installation costs. The device manager 1220 and the plurality of client devices 1222 are configured to operate as discussed above and, particularly configured to receive and transmit frames having a count field. Again, the count field may be used to detect if one or more of the plurality of client devices 1222 is faulted.

In at least some embodiments, the server system 1202 may additionally be configured to communicate directly with one or more of the plurality of client devices 1222, as indicated by communication link 1225 (e.g., via a secure BACnet channel). By virtue of being able to bypass the device manager 1220 and communicate directly with one or more of the plurality of client devices 1222, the server system 1202 may be able to achieve an even faster response from the plurality of client devices. Additionally, in at least some embodiments, one or more of the plurality of client devices 1222 may be ring based Ethernet field controllers. In yet other embodiments, one or more of the plurality of client devices 1222 may include a ring coordinator 1226 for providing advanced logic and features to manage the Ethernet ring. The ring coordinator 1226, in at least some embodiments, may also be a client device that is configured to communicate with the plurality of client devices 1222.

Notwithstanding the fact that in the present embodiment, the device manager 1220 is shown as managing a single ring (e.g., the ring having the plurality of client devices 1222 and the ring coordinator 1226), in other embodiments, the device manager may be configured to manage additional rings and the number of client devices within each ring may vary from one embodiment to another. Likewise, the number of ring coordinators within the ring may vary from one embodiment to another. Furthermore, the device manager 1220 may also be configured, in at least some embodiments, to manage additional devices such as those discussed in FIG. 11 above. In some embodiments, additional device managers 1220 may be used as well.

Referring still to FIG. 12, in at least some embodiments, the network engine 1212 may be configured to manage, via a network 1228, a plurality of network modules 1230. The network 1228 be a master-slave-data-token (MSTP) network, an N2 network, a BACnet network, an Ethernet TCP/IP network, or other network suitable for BMS systems for facilitating communication between the network engine 1212 and the network modules 1230. The other devices 126 may include, in at least some embodiments, a Wi-Fi router 1232, an I/O module 1234, an I/O field controller 1236, and/or one or more IoT devices 1238. The Wi-Fi router 1232 may, in turn, be configured to communicate with a Wi-Fi device 1240 and a Wi-Fi controller 1242. In at least some embodiments, the communication between the Wi-Fi router 1232, and/or the Wi-Fi device 1240 and the Wi-Fi controller 1242 is facilitated through a wireless (e.g., Wi-Fi) connection 1244. The Wi-Fi controller 1242 is in turn configured to communicate with a mobile user interface 1246 via a gateway device 1248 using a wireless connection 1250. In one embodiment, the gateway device 1248 is a mobile access portal gateway device from Johnson Controls. The Wi-Fi router 1232 and the Wi-Fi controller 1242 may facilitate communication between the server system 1202 and the mobile user interface 1246. Likewise, the I/O module 1234, the I/O field controller 1236, and the IoT devices 1238 may communicate with the server system 1202 via the switching module 1210.

Notwithstanding the fact that the switching module 1210 is shown as being connected to the network engine 1212, the Wi-Fi router 1232, the I/O module 1234, the I/O field controller 1236, the IoT devices 1238, the Wi-Fi device 1240, and the Wi-Fi controller 1242, in other embodiments, the switching module may be connected to additional, fewer, or different types of devices and equipment. Furthermore, although the Wi-Fi router 1232, the Wi-Fi device 1240, the Wi-Fi controller 1242, the gateway device 1248, and the mobile user interface 1246 are shown as communicating via the wireless networks 1244 and 1250, in other embodiments, different types of communication methods may be implemented between those devices.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system, comprising:
a network manager device having a first port and a second port, the network manager device configured to control a number of client devices that are connected to the network manager device in a ring network;
a first client device having a first port and a second port, the first port of the first client device connected to the first port of the network manager device and the second port of the first client device connected to a third client device; and
a second client device having a first port and a second port, the first port of the second client device connected to a fourth client device and the second port of the second client device connected to the second port of the network manager device;
wherein the network manager device is configured to transmit a first frame having a first count field to the first client device and to transmit a second frame having a second count field to the second client device;
wherein the first client device is configured to increment the first count field based on a successful transmission of the first frame to the third client device and the second client device is configured to increment the second count field based on a successful transmission of the second frame to the fourth client device;
wherein the network manager device is configured to receive back the first frame and the second frame from the first client device and the second client device; and
wherein the network manager device is configured to generate diagnostic information for the ring network based on both the first count field and the second count field.

2. The system of claim 1, wherein the first count field and the second count field are set to zero when the first frame and the second frame are initially transmitted by the network manager device.

3. The system of claim 1, wherein the first client device is configured to increment the first count field once based on the successful transmission of the first frame to the third client device and the second client device is configured to increment the second count field once based on the successful transmission of the second frame to the fourth client device.

4. The system of claim 3, wherein the first client device is configured to increment the first count field twice based on an unsuccessful transmission of the first frame to the third client device and the second client device is configured to increment the second count field twice based on an unsuccessful transmission of the second frame to the fourth client device.

5. The system of claim 1, wherein the diagnostic information comprises an identity of a first faulted device and an identity of a second faulted device, and wherein the network manager device is configured to divide the first count field and the second count field by a pre-determined value to identify the first faulted device and the second faulted device.

6. The system of claim 1, wherein the diagnostic information comprises an indication that the ring network is in an overloaded condition if the first count field and the second count field are greater than a pre-determined threshold.

7. The system of claim 1, wherein the ring network is an Ethernet network that is run on a Media Redundancy Protocol.

8. The system of claim 1, wherein the first count field and the second count field are integer values.

9. The system of claim 1, wherein the network manager device is configured to generate one or more alerts responsive to a determination that the diagnostic information indicates a problem with the ring network.

10. A method for monitoring integrity of a communication network having a manager device and a plurality of client devices connected to each other and to the manager device in a ring topology, the plurality of client devices configured to be controlled by the manager device, the method comprising:
   transmitting a first frame from the manager device to a first client device, the first frame having a first count field, the first client device connected to a first port of the manager device;
   transmitting a second frame from the manager device to a second client device, the second frame having a second count field, the second client device connected to a second port of the manager device;
   receiving the first frame at the first client device;
   receiving the second frame at the second client device;
   incrementing, by the first client device, the first count field by a value that is dependent on successful transmission of the first frame to a third client device;
   incrementing, by the second client device, the second count field by a value that is dependent on successful transmission of the second frame to a fourth client device;
   receiving, by the manager device, the first frame and the second frame back at the first port and the second port of the manager device; and
   generating, by the manager device, diagnostic information for the communication network using both the first count field and the second count field.

11. The method of claim 10, further comprising determining that the network is in an open condition based on the first frame being received back by the manager device at the first port and the second frame being received back by the manager device at the second port.

12. The method of claim 11, further comprising:
   identifying, by the manager device, a first faulted client device using the first count field by:
      dividing the first count field by a pre-determined value to get a first divided value;
      determining from the first divided value how many of the plurality of client devices closest to the first port of the manager device are operational; and
      identifying the first faulted client device as being located adjacent to an operational client device on the communication network that is situated farthest away from the first port of the manager device.

13. The method of claim 12, further comprising:
   identifying, by the manager device, a second faulted client device by:
      dividing the value of the second count field by the pre-determined value to get a second divided value;
      identifying the second faulted client device based on the second divided value.

14. The method of claim 10, further comprising determining, by the manager device, a number of client devices on the communication network using the first count field and the second count field.

15. The method of claim 14, further comprising determining, by the manager device, that a new client device has been added to the communication network or that a known client device has been removed from the communication network by comparing the number of client devices on the communication network to a previously known number of client devices on the communication network.

16. The method of claim 10, further comprising generating one or more alerts responsive to determining that the diagnostic information indicates a problem with the ring topology.

17. A method for identifying faulted devices in a network of a building management system (BMS) having a manager device and a plurality of client devices connected to each other and to the manager device in a ring topology, the plurality of client devices configured to be controlled by the manager device, the method comprising:
   transmitting a first frame from the manager device to a first client device, the first client device connected to a first port of the manager device, the first frame having a first count field;
   transmitting a second frame from the manager device to a second client device, the second client device connected to a second port of the manager device, the second frame having a second count field;
   receiving the first frame with the first count field at the first client device;
   receiving the second frame with the second count field at the second client device;
   incrementing, by the first client device, the first count field by a value dependent on successful transmission of the first frame to a third client device;
   incrementing, by the second client device, the second count field by a value dependent on successful transmission of the second frame to a fourth client device;
   receiving the first frame and the second frame back at the first port and the second port of the manager device;
   identifying, by the manager device, both a first faulted client device and a second faulted client device using both the first count field and the second count field.

18. The method of claim 17, wherein the manager device identifies the first faulted client device and the second faulted client device by:
   dividing the value of the first or second count field by a pre-determined value to get a divided value;
   determining from the divided value how many of the client devices closest to a port of the manager device where the received first or second frame is received by the manager device, are operational; and
   identifying the first or second faulted client device as being located adjacent to an operational client device on the network that is situated farthest away from the port of the manager device where the received first or second frame is received.

19. The method of claim 17, wherein the manager device is configured to generate one or more alerts after identifying the first faulted client device and the second faulted client device.

20. The method of claim 17, further comprising determining, by the manager device, that the network is in an open condition if the first frame is received back at the manager device at the first port and the second frame is received back at the manager device at the second port.

\* \* \* \* \*